United States Patent
Warren

(10) Patent No.: US 9,746,213 B2
(45) Date of Patent: Aug. 29, 2017

(54) DEMAND FLOW FOR AIR COOLED CHILLERS

(71) Applicant: Siemens Industry, Inc., Alpharetta, GA (US)

(72) Inventor: Duane D. Warren, Plano, TX (US)

(73) Assignee: Siemens Industry, Inc, Alpharetta, GA (US)

( * ) Notice: Subject to any disclaimer, the term of this patent is extended or adjusted under 35 U.S.C. 154(b) by 369 days.

(21) Appl. No.: 14/460,190

(22) Filed: Aug. 14, 2014

(65) Prior Publication Data

US 2016/0047578 A1    Feb. 18, 2016

(51) Int. Cl.
| | |
|---|---|
| F25B 1/00 | (2006.01) |
| F25B 13/00 | (2006.01) |
| F25B 49/02 | (2006.01) |
| F25B 41/04 | (2006.01) |

(52) U.S. Cl.
CPC ............. *F25B 13/00* (2013.01); *F25B 41/04* (2013.01); *F25B 49/02* (2013.01); *F25B 2400/16* (2013.01); *F25B 2600/111* (2013.01); *F25B 2700/15* (2013.01); *F25B 2700/195* (2013.01); *Y02B 30/743* (2013.01)

(58) Field of Classification Search
CPC ...... F25B 13/00; F25B 41/04; F25B 2400/16; F25B 2600/111; F25B 2700/195; F25B 49/02; Y02B 30/743
See application file for complete search history.

(56) References Cited

U.S. PATENT DOCUMENTS

| | | | |
|---|---|---|---|
| 2006/0288713 A1* | 12/2006 | Knight | F24F 3/153 62/176.6 |
| 2008/0115515 A1 | 5/2008 | Bailey et al. | |
| 2009/0091437 A1 | 4/2009 | Corniot | |
| 2009/0171512 A1 | 7/2009 | Duncan | |
| 2010/0000244 A1 | 1/2010 | Kawakatsu et al. | |

(Continued)

FOREIGN PATENT DOCUMENTS

| | | |
|---|---|---|
| WO | 9525251 A1 | 9/1995 |
| WO | 9718420 A1 | 5/1997 |

(Continued)

OTHER PUBLICATIONS

PCT Search Report dated Jan. 5, 2016, for Application No. PCT/US2015/041057, 18 pages.

*Primary Examiner* — Elizabeth Martin

(57) ABSTRACT

For more efficient operation of an air cooled chiller, a refrigerant pump and bypass valve connected in parallel feed refrigerant from the condenser to a receiver. The pump is activated in response to pressure in the condenser; the bypass is used otherwise. Further efficiency is provided by controlling the condenser fan based on power consumption by the air cooled chiller and/or resetting a set point of the evaporator to meet load conditions. An expansion valve for the evaporator is controlled based on chilled water temperature, such as Delta T, or information from an air handling unit. Feedback of valve setting or position, air temperature, valve size, and/or importance of an air handling unit may be used to control the flow of chilled water. In addition to or an alternative to control of the chilled water flow, the refrigerant temperature may be controlled based on information from the air handling unit.

9 Claims, 17 Drawing Sheets

(56) References Cited

U.S. PATENT DOCUMENTS

| | | | |
|---|---|---|---|
| 2011/0022236 A1* | 1/2011 | Higgins | F24F 5/0003 |
| | | | 700/282 |
| 2011/0301766 A1 | 12/2011 | Higgins et al. | |
| 2013/0098086 A1 | 4/2013 | Sillato et al. | |
| 2014/0033753 A1* | 2/2014 | Lu | F25B 49/02 |
| | | | 62/190 |
| 2014/0157821 A1 | 6/2014 | Schrader et al. | |

FOREIGN PATENT DOCUMENTS

| | | |
|---|---|---|
| WO | 02086396 A1 | 10/2002 |
| WO | 2006050132 A1 | 5/2006 |
| WO | 2008002048 A1 | 1/2008 |

* cited by examiner

DEMAND FLOW FOR AIR COOLED CHILLERS

TECHNICAL FIELD

The invention relates generally to chilled water comfort cooling and industrial process cooling systems and, in particular, chilled water cooling systems using an air cooled chiller.

BACKGROUND

Many buildings and campuses are cooled by chilled water plants. In general, these chilled water plants use a chiller to produce chilled water, which is pumped to air handlers to cool building air. Chillers, air handlers, and other components of a chilled water plant are designed to operate at a specific chilled water entering and leaving temperature, or the difference, Delta T. At design Delta T, these components are at their most efficient and can produce cooling output at their rated capacity. Low Delta T, which occurs when the entering and leaving temperature become closer than the design Delta T, reduces efficiency and cooling capacity of the chilled water plant and causes the chilled water plant to use more energy than required for a given demand.

Many mitigation strategies have been developed to address Low Delta T, such as through the use of sophisticated sequencing programs and equipment ON/OFF selection algorithms. For example, chilled water plants using an air cooled chiller may cycle a condenser fan on and off or provide variable condenser fan speeds. As another example, variable chilled water flow is used. In most instances, the chilled water plant operator simply pumps more water to system air handlers to increase their output, but this has the compounding effect of further reducing the already low Delta T. Also, increased pumping results in higher than necessary pumping energy usage. These approaches may not completely resolve the low Delta T.

Air cooled chillers compound the inefficiency. Air cooled chillers are inefficient as compared to water cooled chillers. The condenser section in an air cooled chiller stores a low volume of liquid refrigerant, making low ambient temperature operation difficult because the refrigerant tends to build up in the condenser (i.e., stacking). This build-up causes system pressure to drop, and the chiller to shut down. The condenser fan section is generally set to maintain a constant condensing temperature. This may be ideal for a small range of ambient temperatures, but is usually too high or low at most times of the year. Nuisance trips may be caused by maintenance of the temperature.

SUMMARY

An air cooled chiller and the use of the air cooled chiller in a chilled water plant are provided. For more efficient operation, a refrigerant pump and bypass valve connected in parallel feed refrigerant from the condenser to a receiver. The pump is activated in response, at least in part, to pressure in the condenser, and the bypass is used otherwise. The use of the refrigerant pump and receiver may avoid stacking, handling varying load conditions without forcing refrigerant through the evaporator.

Further efficiency may be provided by controlling the condenser fan based on power consumption by the air cooled chiller. Power usage varies with ambient conditions (e.g., air temperature, sunlight, and wind). Using power consumption feedback to control the fan may tune the condensing based on ambient conditions without requiring various ambient condition sensors.

Yet another improvement in efficiency is provided by resetting a set point of the evaporator to meet load conditions. An expansion valve for the evaporator is controlled based on chilled water temperature, such as Delta T, and/or load information from an air handling unit. Resetting the set point for refrigerant at the evaporator may assist in proper refrigerant flow relative to the demand.

In yet another improvement in efficiency, feedback of valve setting or position, temperature of air, valve size, and/or importance of an air handling unit is used to control the flow of chilled water. A variable pressure curve or other relationship is used with the feedback to control flow of chilled water based on the load, resulting in better control of pressure or pressure differential. In addition to or as an alternative to control of the chilled water flow, the refrigerant temperature may be controlled based on information from the air handling unit.

Any of the improvements may be used alone or in any combination.

In a first aspect, an air cooled chiller is provided. A refrigerant loop has a compressor fluidly connected to a condenser, the condenser fluidly connected to an evaporator, and the evaporator fluidly connected to the compressor. A refrigerant pump and isolation valve are in the refrigerant loop and fluidly connect in parallel with and between the condenser and the evaporator. A receiver fluidly connected with the refrigerant pump.

In a second aspect, a method is provided for controlling an air cooled chiller. Refrigerant is condensed in a condenser and evaporated in an evaporator. Pressure of the refrigerant is controlled, in part, with a compressor. The refrigerant is pumped in response to sensing pressure between the condenser and the evaporator.

In a third aspect, a system is provided for controlling air flow over a condenser. A fan is arranged to cause flow of air over the condenser. A meter is configured to determine energy used by an air cooled chiller, which includes the condenser. A controller is configured to control air flow caused by the fan as a function of the energy.

In a fourth aspect, a method is provided for use of a chiller. An aperture setting of a valve in an air handling unit is determined. One or more parameters from the group of: a discharge temperature of chilled water at the air handling unit, a size of the valve of the air handling unit, and an importance of the air handling unit are determined. Flow of the chilled water of the chiller is controlled as a function of the aperture setting and the one or more parameters.

In a fifth aspect, a method is provided for use of a chiller. An aperture setting of a valve in an air handling unit is determined. A refrigerant temperature in the chiller is controlled as a function of the aperture setting.

Other systems, methods, and/or features of the present embodiments will become apparent to one with skill in the art upon examination of the following figures and detailed description. It is intended that all such additional systems, methods, features and advantages be included within this description, be within the scope of the invention, and be protected by the accompanying claims. Additional features of the disclosed embodiments are described in, and will be apparent from, the following Detailed Description and the figures.

BRIEF DESCRIPTION OF THE FIGURES

The components in the figures are not necessarily to scale, emphasis instead being placed upon illustrating the prin

DETAILED DESCRIPTION

Figure 1:
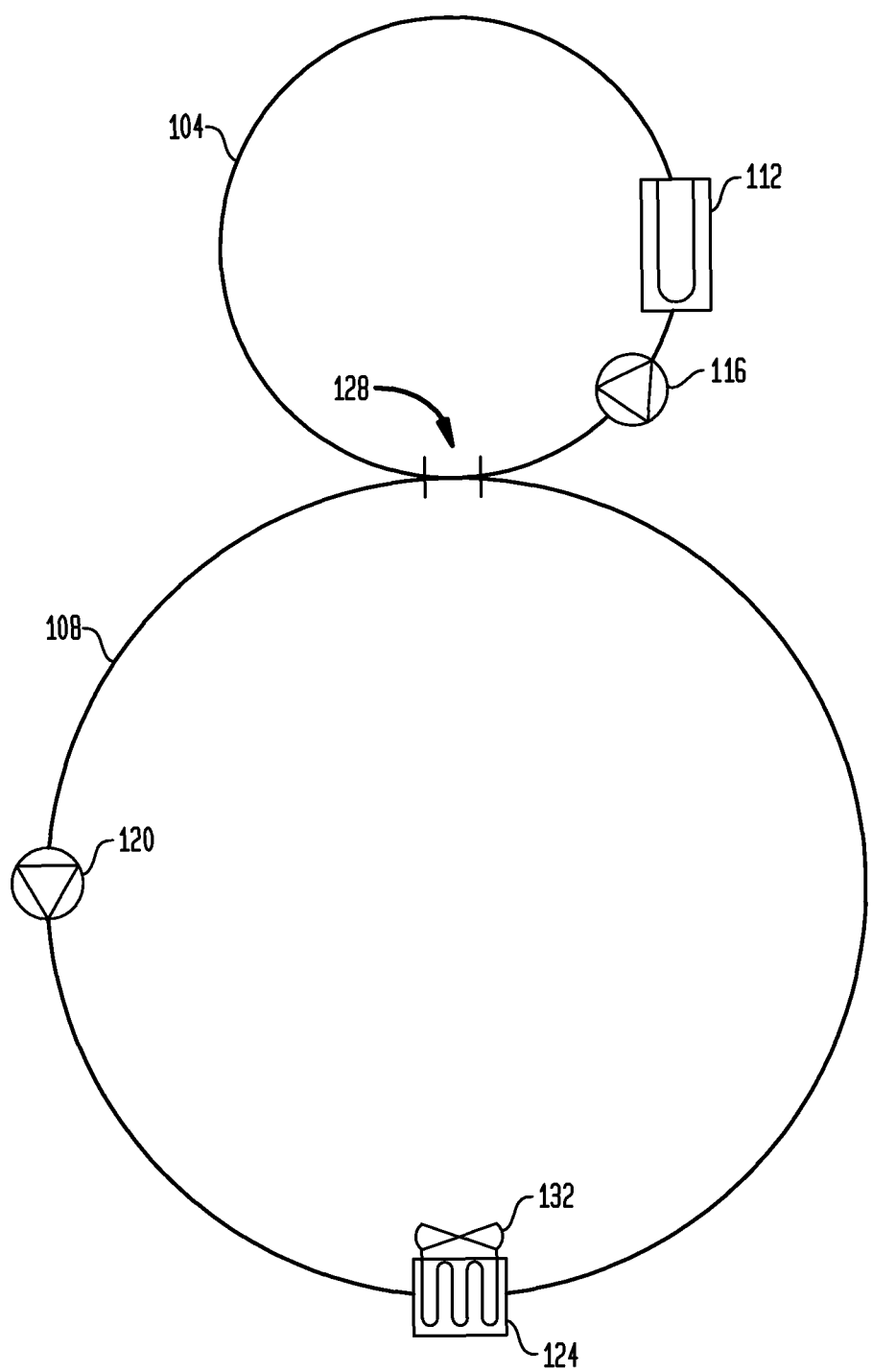
- FIG. 1 is a block diagram illustrating an exemplary decoupled chilled water plant.

In the following description, numerous specific details are set forth in order to provide a more thorough description of the present invention. It will be apparent, however, to one skilled in the art, that the present embodiments may be practiced without these specific details. In other instances, well-known features have not been described in detail so as not to obscure the invention.

An air cooled chiller is created or modified to accept demand flow processes and integration of variable air volume (VAV) or other load side management routines. For example, air cooled chillers are controlled as part of a chilled water plant, such as with the control disclosed in U.S. Published Patent Application No. 2011/0301766, the disclosure of which is incorporated herein by reference. In one embodiment, the control of the chilled water disclosed therein is performed. Some or any of the controls may be used, such as using the demand flow, variable pressure curve logic, condenser pressure set point or reset, evaporator pressure set point or reset, chilled water temperature set point or reset, and/or other control for the chilled water and/or the chiller with the air cooled chiller disclosed herein. For example, the chilled water flow is controlled with the variable pressure curve logic with feedback from the load (e.g., air handling unit) in the air cooled chiller. As another example, the expansion valve of the evaporator in the air cooled chiller is controlled to reset the refrigerant evaporator set point to meet load conditions (e.g., by varying the chilled water set point to meet demand).

In one embodiment, air cooled chiller operations are integrated with load information from space and ambient conditions to produce the lowest annual kW/ton. The space information may be feedback from one or more air handling units, such as feedback of valve position (amount open or closed), temperature, valve size, and/or importance of the air handling unit to the overall chilled water plant. The ambient conditions (e.g., temperature, sun light, and/or wind) are accounted for by measuring the power used by the air cooled chiller rather than complications from downloading weather information and/or sensing weather information.

In another embodiment, a floating refrigerant chiller set point of the evaporator is tied to load. Where the chilled water flow rate is set based on demand, the flow rate may reach a minimum. At the minimum, the refrigerant set point may be increased. The refrigerant set point may be varied based on the load rather than waiting until a minimum is reached, such as controlling expansion valves of an evaporator based on information from the air handling unit.

In another embodiment, floating head pressure is tied to the chiller output. The refrigerant pressure in the evaporator and/or condenser varies. This pressure forces the refrigerant through the expansion valve of the evaporator. By controlling the pressure at one or more locations based on chiller output, more efficient operation may be provided.

In yet another embodiment, variable pressure control logic is used to drive chiller set points and output. Alternatively or additionally, chilled water flow and/or refrigerant temperature is controlled based on demand information from air handling units. The information may be a valve position, valve size, temperature of air, and/or importance of the air handling unit. The pressure in the air cooled chiller is controlled based on load, as indicated by the demand information. The chilled water flow rate affects the settings of the evaporator, which in turn alters the pressure of the refrigerant elsewhere in the air cooled chiller.

Different approaches may provide different amounts of increases in efficiency. For example, using the various improvements discussed above, air cooled chiller seasonal efficiency may improve by approximately 40%.

Referring to U.S. Published Patent Application No. 2011/0301766, the control of chilled water is provided in a chilled water system. A critical zone reset may increase cooling output. For example, a flow rate may be increased by resetting a Delta T when a water valve of the air handler unit opens beyond a particular threshold. This increase to the flow rate causes an increase to cooling output at the air handler. In addition to valve opening, the valve size, air handler importance, and/or temperature (e.g., temperature of air leaving the air handling unit) are used to control the timing and/or magnitude of the reset.

Demand flow, in other exemplary embodiments, may further be implemented according to demand flow variable pressure curve logic (VPCL). Demand flow VPCL represents an operational strategy that optimizes the total energy consumption of the chiller, chilled water pump, the condenser fan, and air handling unit along a calculated efficiency curve. The operational strategy represented by demand flow VPCL individually and holistically optimizes the active pressure curve setpoints for each of the pumps operable within a chilled water plant. In response to the optimization of the active pressure curve setpoints for each of the pumps, the speed and energy usage associated with the condenser fan and the air handling unit may also be adjusted and optimized. The settings of valves, such as the evaporator expansion valves, may be adjusted.

An air cooled chiller is implemented in a chilled water system operating pursuant to Demand Flow. Demand Flow, as described herein, refers to methods and apparatus to reduce or eliminate Low Delta T and to improve chilled water plant efficiency. Demand Flow may be implemented in retrofit projects for existing chilled water plants as well as new installations or designs of chilled water plants. Chilled water plant refers to cooling systems utilizing chilled water to provide comfort cooling or chilled water for some process need. Such chilled water plants are typically, but not always, used to cool campuses, industrial complexes, commercial buildings, and the like.

In general and as will be described further below, Demand Flow utilizes variable flow or pumping of chilled water within a chilled water plant to address Low Delta T and to substantially increase the efficiency of a chilled water plant. Variable flow under Demand Flow maintains a Delta T for chilled water plant components where the Delta T is at or near the design Delta T for the components. As a result, Demand Flow substantially increases the operating efficiency of chilled water plants and components thereof, resulting in savings in energy costs. The increased efficiency provided by Demand Flow may also reduce pollution. Furthermore, Demand Flow may also increase the life expectancy of chilled water plant components by operating these components near or at their specified entering and leaving chilled water temperatures, or design Delta T, unlike traditional variable or other pumping techniques.

Demand Flow provides increased efficiency regardless of cooling demand or load by operating chilled water plant components in a synchronous fashion. In one or more embodiments, this occurs by controlling chilled water pumps and a condenser fan to maintain a Delta T at particular components or points of a chilled water plant. In general, Demand Flow operates on individual condenser fans or water pumps to maintain a Delta T across a particular component or point of a chilled water plant. For example, primary chilled water pumps may be operated to maintain a Delta T across a chiller, secondary chilled water pumps may be operated to maintain a Delta T across plant air handlers, and condenser fans may be operated to maintain a Delta T across a condenser.

The control of individual pumps or motors (and flow rate) in this manner results in synchronized operation of a chilled water plant. This synchronized operation balances flow rates in the chilled water plant, which significantly reduces or eliminates Low Delta T Syndrome and related inefficiencies.

Because flow rates are controlled by Demand Flow to maintain a Delta T and not to maintain Delta P or a particular cooling output at plant air handlers, there may be situations where the flow rate is too low to produce the desired amount of cooling output in certain areas based on system diversity. To address this, Demand Flow includes a feature referred to herein as a critical zone reset, which allows the Delta T maintained by Demand Flow to be reset to another, typically lower, value based on a specific need of the system that is not being fully met at the required flow rate of the system. This can be due to inadequate piping, incorrectly sized air handlers for the load being served, or any number of unforeseen system anomalies. This allows additional cooling to be provided by maintaining a new or reset Delta T generally by increasing chilled water flow. The application of Demand Flow has a synergistic effect on air handlers as well as chillers, pumps, and other components of a chilled water plant. This may result in reduced net energy usage while maintaining or even increasing the rated capacity for the chilled water plant. Under Demand Flow, little or no excess energy is used to provide a given level of cooling.

FIG. 1 shows an exemplary decoupled chilled water plant. In other embodiments, a single loop is provided in a direct-primary chilled water plant. Other types of chilled water plants may be used.

In addition to describing the chilled water plant, Low Delta T is described with regard to FIG. 1. As shown, the chilled water plant includes a primary loop 104 and a secondary loop 108. Each loop 104, 108 may have its own entering and leaving water temperature, or Delta T. During operation of a decoupled chilled water plant, chilled water is produced in a production or primary loop 104 by one or more chillers 112. This chilled water may be circulated in the primary loop 104 by one or more primary chilled water pumps 116. Chilled water from the primary loop 104 may then be distributed to a building (or other structure) by a distribution or secondary loop 108 in fluid communication with the primary loop 104. Within the secondary loop 108, chilled water may be circulated by one or more secondary chilled water pumps 120 to one or more air handler units 124. The air handler units 124 allow heat from the building's air to be transferred to the chilled water, such as through one or more heat exchangers. This provides cooled air to the building. Typically, building air is forced or blown through a heat exchanger in an air handler unit 124 to better cool a volume of air. The chilled water leaves the air handler units 124 returning to the secondary loop 108 at a higher temperature due to the heat the chilled water has absorbed via the air handler unit or units 124.

The chilled water then leaves the secondary loop 108 and returns to the primary loop 104 at the higher temperature. Both the primary loop 104 and secondary loop 108 (as well as the chilled water plant components attached to these loops) have an entering water temperature and a leaving water temperature, or Delta T. In an ideal situation, the entering and leaving temperatures for both loops would be at their respective design Delta Ts. Unfortunately, in practice, the chilled water loops operate at chronic low Delta T.

Low Delta T occurs for a variety of reasons. In some cases, low Delta T occurs because of an imperfect design of the chilled water plant. This is relatively common due to the complexity of chilled water plants and difficulty in achieving a perfect design. To illustrate, air handler units 124 of the secondary loop 108 may not have been properly selected and thus chilled water does not absorb as much heat as expected. In this case, the chilled water from the secondary loop 108 enters the primary loop 104 at a cooler temperature than expected, resulting in low Delta T. It is noted that, due to imperfect design and/or operation, a chilled water plant may be operating at low Delta T under various loads, including design condition loads.

Low Delta T also occurs as cooling output is lowered to meet a load that is less than the design condition. As output is lowered, chilled water flow, chilled water Delta T, and other factors become unpredictable, often resulting in low Delta T. In fact, in practice, Delta P flow control schemes invariably result in low Delta T at some, if not all, chilled water plant components. For example, to reduce cooling output from design conditions, one or more chilled water valves of the chilled water plant's air handler units 124 may be closed (partially or completely). This reduces chilled water flow through the air handler units 124 and thus less cool air is provided. However, now that the chilled water valves are partially closed, the chilled water absorbs less heat from the air as the water flows through the air handler units 124 at a higher rate than necessary. Thus, the chilled water leaving the air handler units 124 is not as "warm" as intended in the design. As a result, the chilled water leaving the secondary loop 108 for the primary loop 104 is cooler than desired, causing low Delta T in both loops.

Another cause of low Delta T is bypass mixing caused by excess flow within the primary loop 104, the secondary loop 108, or both. To illustrate, 300 gallons per minute (GPM) excess flow of 54 degree water from the secondary loop 108 would mix with 40 degree chilled water from the primary loop 104 in the bypass 128, raising the temperature of the secondary loop's chilled water to 42 degrees. Now, the secondary loop's chilled water has a temperature higher than the primary loop's chilled water. This causes low Delta Tin the primary loop 104 and the secondary loop 108 and a corresponding reduction in cooling capacity.

Bypass mixing of chilled water streams is also undesirable because it exacerbates low Delta T. Excess flow and bypass mixing also cause excess energy usage for a given cooling demand.

In many cases, these measures (e.g. increased chilled water pumping, opening of air handler water valves, increased air supply air movement) do not fully compensate for the artificial reduction in cooling capacity caused by low Delta T. Thus, the chilled water plant is simply unable to meet the demand for cooling even though this level of demand may be below its rated chilling capacity.

Low Delta T also occurs in direct-primary chilled water plant configurations (i.e. non-decoupled chilled water plants), even though such configurations generally do not have the problem of mixing building return water with production supply water. Direct-primary systems invariably have a plant or system bypass, 3-way valves, or both in order to maintain minimum flow through the system.

Figure 2:
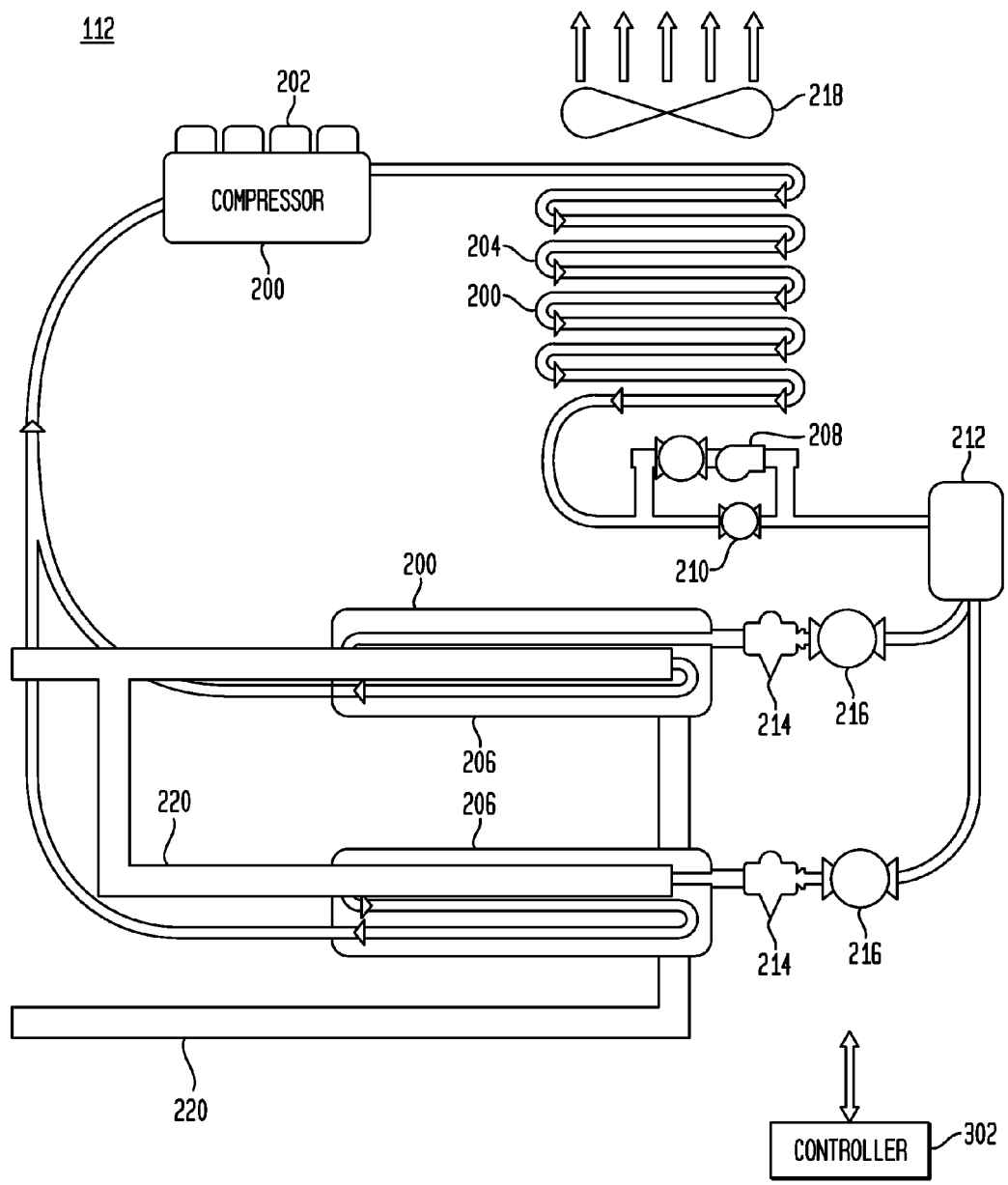
FIG. 2 illustrates one embodiment of an air cooled chiller.

FIG. 2 illustrates an exemplary air cooled chiller 112 for use in a chilled water plant. The air cooled chiller 112 includes a refrigerant loop 200. The refrigerant loop 200 includes a compressor 202, condenser 204, refrigerant pump 208, by pass valve 210, receiver 212, and evaporator 206 with expansion valves 214 and solenoid valves 216. A condenser fan 218 for forcing air over the condenser 204 is also provided in the air cooled chiller 112. For illustrative purposes, the chilled water pipes 220 are shown connected with the air cooled chiller 112. Additional, different or fewer components may be provided, such as further valves, pumps, and/or sensors. In one example, a controller 302 is provided. The arrow to and from the controller 302 represents inputs from various sensors and outputs to various components for control operation.

The components in the refrigerant loop 200 fluidly connect with each other. Pipes, lines, or tubes housing refrigerant as a vapor or gas and/or as a liquid connect between the components. The connection may be direct, such as from the evaporator 206 to the compressor 202 or the compressor 202 to the condenser 204. The connection may be indirect, such as there being one or more intervening components. For example, the connection from the condenser 204 to the evaporator 206 includes the intervening refrigerant pump 208, bypass valve 210, and receiver 212. Where the expansion valves 214 and solenoid valves 216 are considered separate from the evaporator 206, the expansion valves 214 and solenoid valves 216 also intervene.

More than one route may be provided between components or bypassing one or more components. For example, the bypass valve 210 is connected in parallel with the refrigerant pump 208. As another example, the refrigerant loop splits to flow in parallel through different parts of the evaporator 206. The refrigerant may flow only in one or the other or in both where there is a bypass or alternative route. FIG. 2 represents one example, but other fluid interconnections may be provided.

The refrigerant loop 200 of the air cooled chiller 112 interacts with two or more other systems. The condenser 204 includes the fan 218 for thermodynamic interaction with air or the ambient environment. The evaporator 206 includes pipes or channels for interacting with the load through the chilled water pipes 220. Additional, different, or fewer systems interacting with the air cooled chiller 112 may be provided.

The evaporator 206 is formed from one or more parts. As shown in FIG. 2, two parallel evaporator parts are provided. Each part may be activated or not by the corresponding expansion valves 214. Each part is identical to the others, but different parts may be sized smaller or larger than each other in other embodiments. The division and control through the expansion valves 214 may allow the evaporator 206 operation to better match the demands of the load (chilled water). The load is more often not at the maximum or even near the maximum of the design. As a result, the air cooled chiller 112 may often operate with fewer than all (e.g., only one) of the evaporator parts at a given time (i.e., run on one circuit instead of both). Alternatively, the evaporator parts are operated at a same time for lesser loads where each part is partially loaded. Under Demand Flow operation, one evaporator part may operate with a fully open expansion valve 214, instead of two partially loaded evaporators (i.e., partially closed or open expansion valves 214). Less restriction in the flow of refrigerant by the expansion valves 214 results in less energy wasted.

The expansion valves 214 are configured by feedback and process control to fluidly connect and disconnect the evaporator parts individually based on chilled water temperature. The chilled water temperature is used as an indication of the load. In other embodiments, other information, such as from the air handling units or condenser fan operation, is alternatively or additionally used to control the expansion valves 214. The expansion valves 214 work to maintain constant refrigerant temperature and pressure.

The solenoid valves 216 are liquid line solenoid valves. In response to control signals, the solenoid valves 216 open or close to enable or disable evaporator circuits (e.g., sections). The control of the solenoid valves 216 may be responsive to a temperature of the chilled water, such as a temperature of the chilled water leaving the evaporator 206. The solenoid valves 216 open or close to maintain leaving chilled water temperature.

In operation, chilled water may enter the evaporator 206, where the chilled water, as "warmed" by the air handling units, transfers heat to the refrigerant. This evaporates the refrigerant, causing the refrigerant to become refrigerant vapor. The heat transfer from the chilled water cools the chilled water in the pipes 220, allowing the chilled water to return to the air handling units or other load. To illustrate, 54 degree chilled water may be cooled to 42 degrees by transferring heat to 40 degree refrigerant within the evaporator 206. The 42 degree chilled water may then be used to cool a building or other structures.

In order for the refrigeration cycle to continue, refrigerant vapor produced by the evaporator 206 is condensed back into liquid form. This condensation of refrigerant vapor may be performed by the condenser 204. As is known, the refrigerant vapor can only condense on a lower temperature surface. Because refrigerant has a relatively low boiling point, refrigerant vapor has a relatively low temperature. For this reason, a compressor 202 may be used to compress the refrigerant vapor, raising the vapor's temperature and pressure.

The refrigerant travels from the evaporator to the compressor 202. Any now know or later developed compressor may be used. The compressor 202 is a positive displacement (e.g., rotary or reciprocating) or dynamic (e.g., centrifugal or axial) compressor for increasing the pressure of the refrigerant vapor by reduction in volume. The refrigerant output of the compressor 202 is to the condenser 204. The compressor 202 sends high temperature gas to the condenser 204.

The condenser 204 is a heat exchanger, such as a coil with a serpentine or other configuration (e.g., modified cross flow). The surface area is increased to provide greater exposure to air, the cooling medium. The condenser 204 cools the refrigerant vapor down to a liquid, which is then passed to the evaporator 206 due to pressure from the compressor 202.

The increased temperature of the refrigerant vapor from the compressor 202 allows the vapor to condense at a higher temperature. For example, without compression, the refrigerant vapor may be at 60 degrees, whereas with compression the vapor may be at 97 degrees. Thus, condensation may occur below 97 degrees rather than below 60 degrees. This is highly beneficial because it is generally easier to provide a condensing surface having a temperature lower than the increased temperature of the refrigerant vapor.

The refrigerant vapor enters the condenser 204 where the heat of the vapor may be transferred to air, causing the refrigerant to return to a liquid state. For example, the condenser 204 may comprise a shell and tube design where the air flows through the condenser's tubes. In this manner, refrigerant vapor may condense on the tubes within the condenser's shell. After condensing, the refrigerant then returns through a refrigerant line and pressure reducer back to the evaporator 206, where the refrigeration cycle continues.

The condenser 204 includes or is adjacent to one or more fans 218 to increase the flow of air across the condenser 204. By controlling the ambient air flow, the fans 218 affect the rate of condensation in the condenser 204. Since the condenser 204 is exposed to ambient conditions reflected by the air temperature, any exposure to sunlight, and/or wind levels, the rate of condensation for a given fan speed may be different depending on the ambient conditions.

The fan 218 is any now known or later developed condenser fan to cause air flow across or through the condenser 204. The fan 218 is positioned in or adjacent to the condenser 204. Alternatively, the fan 218 is spaced from the condenser 204, such as by a duct for guiding air to and/or from the condenser 204.

The fan 218 includes a blade and a motor. Any blade may be used. Any motor may be used. In one embodiment, the motor is a variable drive, such as a variable frequency drive (VFD). In response to a control signal, such as in response to a frequency, duty cycle, amplitude, or other signal characteristic, the motor controls the speed of the fan 218.

Change in the speed of the fan 218 causes greater or lesser air flow for greater or lesser condensation in the condenser 204. The change in air flow by the condenser fans 218 may be used to more closely regulate condenser pressure to maintain a lowest power use of the condenser fans 218, refrigerant pump 208, and the compressors 202.

In a system for controlling air flow, the condenser fan 218 is responsive to a control signal feeding back ambient information. Rather than measuring temperature of the air, wind speed, and/or sun light, the ambient conditions are based on power usage of the chiller. The air cooled chiller 112 draws power from a single electrical circuit, but may draw power from multiple circuits. The amount of energy used by one or more, such as all, of the components of the air cooled chiller 112 is measured. For example, a power meter is positioned to measure the power used by the compressor 202, fan 218, and pump 208. As another example, the power meter is configured to measure the power used by the condenser fan 218, refrigerant loop power, and refrigerant pump 208 power. Greater power demand indicates less optimal ambient conditions (e.g., more sun light, less wind, and/or higher temperature air). Using the power information from the power meter, the speed of the fan 218 and resulting air flow may be increased or decreased.

Any power meter may be used, such as a meter for measuring kW/h. Any characteristic of energy usage may be measured. Other inputs may be used for additional air flow control. For example, the fan speed is varied as a function of both the power and a pressure of refrigerant sensed in the condenser 204. Any function combining these two inputs to determine fan speed may be used.

Due to stacking, the liquid refrigerant may build up in the condenser 204. Stacking occurs during low ambient temperature operation. The low ambient temperature reduces the rate of condensation in the condenser 204. The result of stacking is a buildup of liquid refrigerant and pressure between the condenser 204 and the evaporator 206.

To avoid stacking in the air cooled chiller, the refrigerant pump 208 is provided in the condenser 204, in the evaporator 206, or between the condenser 204 and the evaporator 206. Any refrigerant pump may be used, such as a hermetically sealed liquid pump.

The refrigerant pump 208 is responsive to control signals based on pressure between the condenser 204 and the evaporator 206. A pressure sensor in the condenser 204, such as at a liquid exit of the condenser 204, senses the pressure. A pressure sensor in the evaporator 206, such as at an entrance to the evaporator 206, senses the pressure. The lift or pressure between the condenser 204 and the evaporator 206 is determined from the sensed pressures. The control loop activates the refrigerant pump 208 to pump liquid from the condenser 204 in response to the pressure or lift being above a threshold amount, such as 80 psi.

When stacking does not occur, operation of the refrigerant pump 208 becomes inefficient. Thus, the refrigerant pump 208 is connected in parallel with the bypass valve 210. The bypass valve 210 is an expansion valve, solenoid valve, or other valve responsive to control signals for isolating the refrigerant pump 208. A valve may also be installed in series with the refrigerant pump 208 to allow flow to or not allow flow to the refrigerant pump 208. The bypass valve 210 operates in conjunction with the refrigerant pump 208. The bypass is closed when the refrigerant pump 208 is operating and open when the refrigerant pump 208 is not operating.

The operation of the refrigerant pump 208 forces refrigerant from the condenser 204 to the evaporator 206. To avoid unwanted increases in pressure caused by the refrigerant pump 208 and to accommodate the variable amount of refrigerant required by changing ambient and load conditions, the receiver 212 is provided. The receiver 212 connects with the refrigerant pump 208. The receiver 212 may be bypassed with the refrigerant pump 208 by the bypass valve 210 or may be connected two both paths (i.e., pump 208 and bypass valve 210 as shown in FIG. 2). In the example of FIG. 2, the receiver 212 fluidly connects between (i) the refrigerant pump 208 and isolation valve 210 and (ii) the evaporator 206.

The receiver 212 is a metal housing for holding liquid refrigerant. Any size may be used, such as the receiver 212 having 1 $ft^3$ for every 200 tons of refrigerant.

The receiver 212 is a tank to hold the liquid refrigerant in varying load conditions. During operation, the refrigerant pump 208 and receiver 212 stop refrigerant from backing up in the condenser 204 and allow better low temperature operation. The refrigerant pump 208 and receiver 212 may also provide for better control of refrigerant pressure and a closer match of chiller output to load. By reducing or eliminating stacking, control of the air chiller 112 may more closely meet the demand by the load. This pressure control is matched to chilled water requirements and control requirements. The refrigerant pump 208 and receiver 212 may also allow the system pressures to be manipulated so that the expansion valves 214 can operate in an open position.

Figure 3:
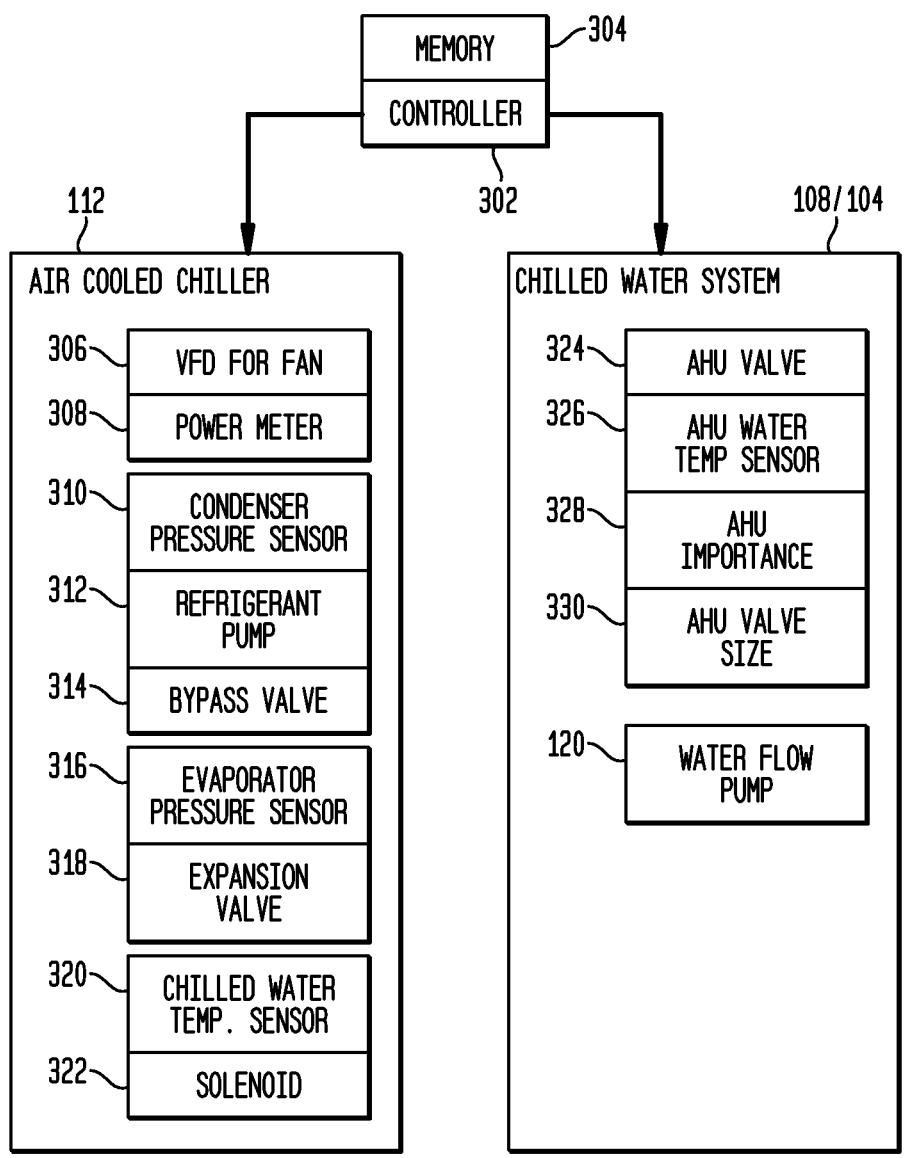
FIG. 3 is a block diagram illustrating a control arrangement.

The air cooled chiller 112 includes various controlled components, such as controlling the compressor 202, the expansion valves 214, the solenoid valves 216, the bypass or isolation valve 210, the refrigerant pump 208, and the fan 218. Components of the chilled water plant, such as a chilled water pump, may also be controlled. Similarly, the control occurs in response to one or more sensors and/or set points. The controller 302 performs the control of the components. FIG. 3 shows a controller 302 for controlling and/or receiving information from the air cooled chiller 112 and/or the chilled water system 104/108. Additional, different, or fewer sensors and/or controlled components may be provided.

The controller 302 is a processor, computer, tablet, application specific integrated circuit, field programmable gate array, analog circuit, digital circuit, field panel, or other controller. A single controller 302 is shown, but an arrangement of different controllers may be used. For example, different controllers are provided for different components (e.g., controller for the fans 218 different than the controller for the refrigerant pump 208). The distributed controllers may communicate for interactive control, may be controlled by a master controller, and/or may operate independent of other control.

The memory 304 is a random access memory (RAM), read only memory (ROM), removable media, flash, solid state, or other memory. The memory 304 stores set points, sensor values, control information, and/or instructions for control by the controller 302. For example, the memory 304 is a non-transitory computer readable storage medium for storing instructions. When the physical controller 302 executes the instructions, the controls discussed herein are performed.

The controller 302 implements the control functions described herein. For example, the methods are performed under the control of the controller 302. Sensor provide information to the controller 302 and/or the controller 302 queries the sensors. Settings or other information are known by, provided to, and/or read by the controller 302. The controller 302 generates control signals to cause a change in operation of one or more components.

In one embodiment, the controller 302 is configured by the instructions to control the air flow caused by the fan 218. The variable frequency drive 306 of the fan 218 is controlled using energy information from the power meter 308. The controller 302 controls the air flow caused by the fan 218 as a function of the energy usage of the air cooled chiller 112. Additionally or alternatively, other information than energy usage may be used to control the air flow, such as using a measure of pressure in the condenser from the pressure sensor 310.

In another embodiment, the controller 302 is configured to control the refrigerant pump 312 and bypass valve 314. Based on pressure between the condenser and the evaporator (i.e., lift) sensed by pressure sensors 310, the pump 312 is activated or not. The bypass valve 314 is controlled to provide bypass, isolating the pump 312, when the pump 312 is not operating and is controlled to not allow bypass when the pump 312 is operating.

In yet another embodiment, the controller 302 is configured to control the expansion valve 318 of the evaporator. In response to refrigerant pressure from a pressure sensor 316 at an exit or within the evaporator, the expansion valve 318 of one or more parallel parts of the evaporator are altered to further restrict or increase flow of refrigerant. The change may be to turn off or on evaporator parts by either allowing or not allowing refrigerant flow to the part. Since the load dictates the flow of chilled water, the load influences the pressure in the evaporator. The controller responds with control of the expansion valves 318.

The expansion valve 318 is controlled to set the refrigerant temperature. In addition or as an alternative to control based on pressure, information from the air handling unit or other load is used. For example, a valve position 324 with or without other parameters (e.g., air temperature or difference of air temperature from set point of the air handling unit 326; importance of the air handling unit 328; and/or valve size of the air handling unit 330) are used to control the expansion valves 318. Where increased load is indicated by the valve position and/or other parameters, additional parts of the evaporator are activated and/or the amount of flow through the parts is altered to provide refrigerant at the desired temperature. The expansion valves operate in response to the load.

The controller 302 is configured to control the solenoids 322 of the evaporator. In response to chilled water temperature from a sensor 320 at the exit, entrance, or other location of chilled water in the evaporator, the controller 322 increases or decreases flow of refrigerant to the evaporator or part. By increasing or decreasing flow, the temperature of the chilled water may be controlled.

In another embodiment, the controller 302 is configured to control a chilled water pump 120. The flow of chilled water through the evaporator is controlled. Any sensors and/or information may be used to control the water flow. In the example of FIG. 3, the valve position (e.g., size of aperture, amount open or closed) of an air handling unit, a temperature of the air exiting the air handling unit (e.g., difference from set point), an importance of the air handling unit, and the valve size of the valve of the air handling unit are used. Additional, different, or fewer types of information may be used. For example only one (e.g., valve position), two or more, or three or more of the types of information are used. Any function may be used for combining the information. For example, the valve position (e.g., 80% open) is a starting value, which is then modified by other information. The 80% is decreased for smaller valves or increased for larger valves; the importance increases or decreases the value; and lower temperatures decrease the value while greater temperature increases the value. The alteration of the value is not for altering the actual valve position, but is instead used to alter the control value. Where multiple air handling units are serviced, the control values for each air handling unit are combined, such as using a high weighted mean (e.g., average of the average and the highest value). Any function for combination of control values from different air handling units may be used.

The resulting indication of load is used in any control sequence to control the chilled water flow. For example, a proportional integral derivative (PID) control loop is used. In one embodiment, a variable pressure curve is used to control the flow of chilled water based on the value calculated from the load devices.

In addition to or an alternative to chilled water flow, the refrigerant temperature is controlled based on information from the air handling unit. For example, the position of a valve 324 of the air handling unit is used as an input for control of the expansion valves 318. Other parameters from the air handling unit and/or the air cooled chiller 112 (e.g., evaporator pressure 316) may also be used for control of the expansion valves 318. The expansion valve 318 position and/or activation of the different parts are controlled based on the load (air handling unit information) and/or pressure in the refrigerant loop.

The air cooled chiller 112 is used in the chilled water plant. The control operation uses demand flow in variable air volume or other environments. Air cooled chillers 112 may be used with any chilled water plant. In some embodiments, the air cooled chillers 112 are used in data centers where space for water cooling is not available. In other embodiments, air cooled chillers 112 are used due to lesser initial cost than water cooled chillers. In yet other embodiments, regulations may prevent use of water cooled chillers, so the air cooled chiller 112 is used instead.

The overall control is synchronized between the different components. The synchronization is through interaction of the control functions by the controller 302. Alternatively or additionally, synchronization occurs through the refrigerant loop. For example, chilled water flow is controlled. As a result, the evaporator pressure changes. The control routines relying on evaporator pressure (e.g., operation of the refrigerant pump, operation of the evaporator expansion valves, and/or selection of evaporator parts) measure the pressure and react accordingly. Through this synchronization, an operational strategy to provide efficient cooling is implemented by the controller 302.

Operational strategy refers to the principles, operations, and algorithms applied to the chilled water plant, air cooled chiller, and components thereof to achieve Demand Flow's benefits to plant energy usage and cooling capacity. Application of the operational strategy may reduce or eliminate Low Delta T by operating chilled water plant components at or near design Delta T, regardless of load conditions. This in turn optimizes energy usage and deliverable capacity for chilled water plant components and the plant as a whole.

Figure 4:
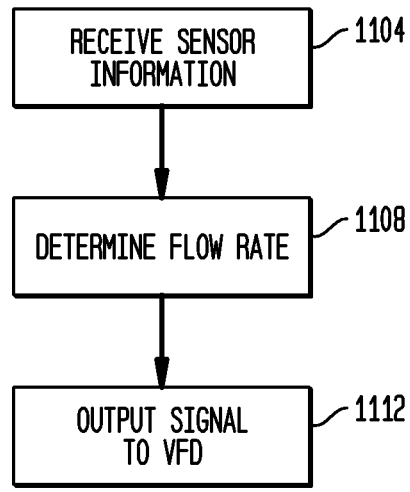
FIG. 4 is a flow diagram illustrating an exemplary controller in operation.
Figure 11:
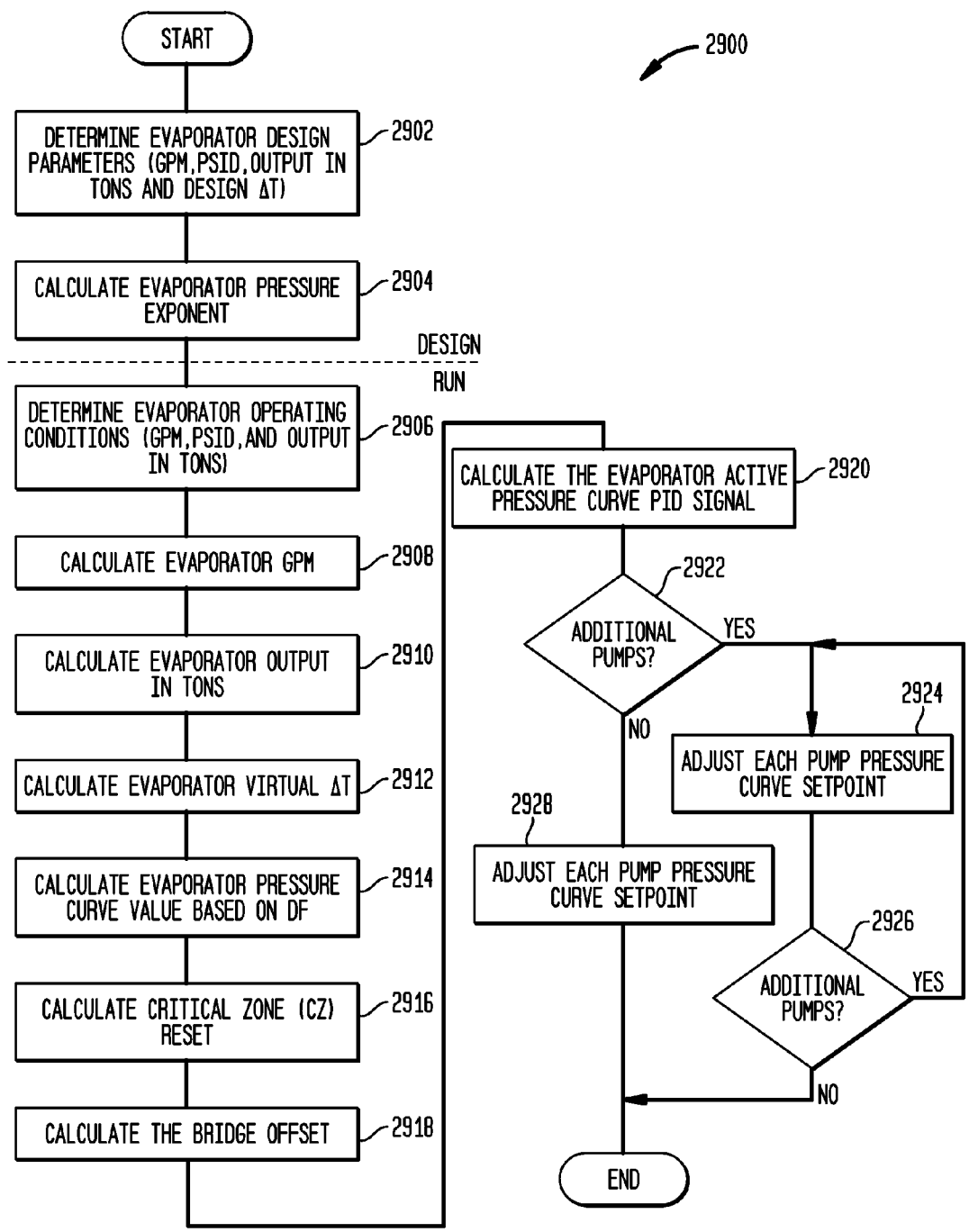
FIG. 11 is a flow diagram illustrating an exemplary Demand Flow evaporator routine or algorithm in operation.
Figure 12:
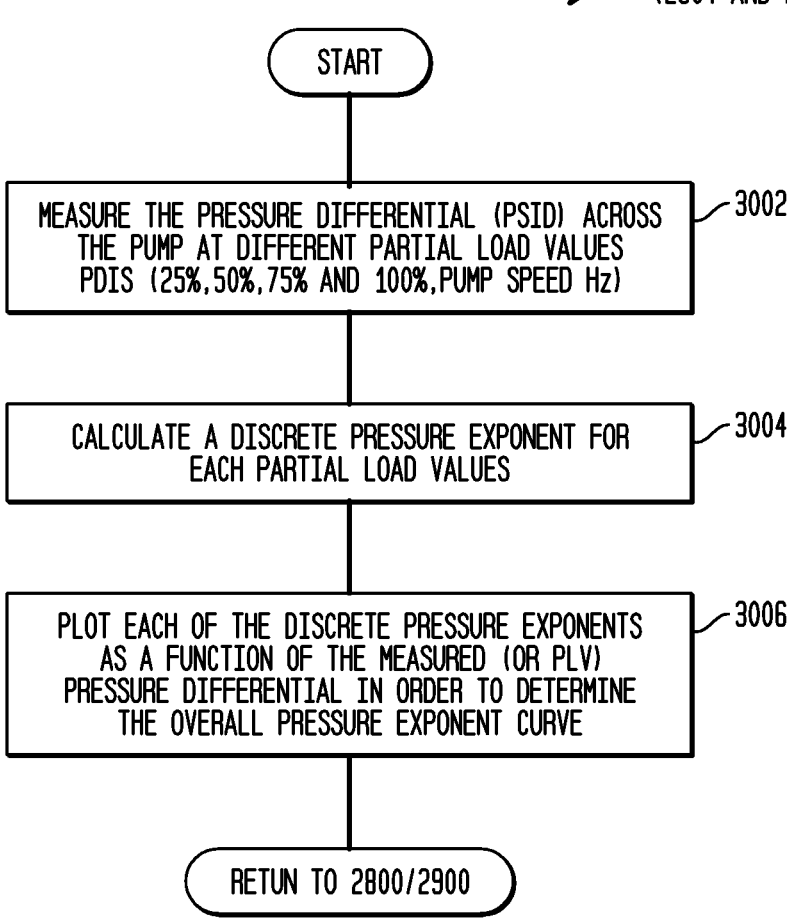
FIG. 12 is a flow diagram illustrating an exemplary routine or algorithm for determining the P Exponent variable for a given pump.

FIG. 4 shows a generalized control method. FIGS. 5-7 and 9-10 represent example general control strategies or methods for specific control aspects. FIGS. 11-12 represent some generalized control principles. FIGS. 14-19 are example embodiments of specific control strategies for specific control aspects. The various set points, increment sizes, measures, thresholds, calculations, and/or times may have different values.

FIG. 4 is a flow diagram illustrating exemplary operations which may be performed by a controller 302 to perform the operational strategy. Some acts described herein may be performed in different order than described herein, and there may be fewer or additional steps in various embodiments corresponding to various aspects of the operational strategy.

In the embodiment shown, sensor information is received at act 1104. For example, sensor information regarding pressure, temperature, or derivations thereof may be received. Refrigerant and/or chilled water characteristics may also be received. Also, operating characteristics, such as the position of chilled water valves at air handlers, the speed or output of VFDs, the speed or flow rate of pumps, as well as other information may be received.

At act 1108, based on the information received in step 1104, the controller may determine whether to increase or decrease flow rate of one or more pumps, alter valve position, and/or alter fan speed, such as to maintain a Delta T near or at design Delta T. The operation of any type of component may be controlled.

At act 1112, an output may be provided, such as to a VFD or other pump controller, valve, or even to a pump directly to increase or decrease as determined in act 1108.

The acts are performed in response to triggers, such as in response to a change in an input. Alternatively or additionally, the acts are performed periodically. For example, the control routine for a given component, for synchronizing the components, and/or for operating the air cooled chiller is performed once every 5 minutes. Sensors are queried or the most recent readings examined to determine any new settings for operating the components at the beginning of each period.

The operational strategy may also include one or more set point resets, such as resetting the refrigerant temperature setting at the evaporator. A set point reset may be used to increase or decrease cooling output, such as by increasing or decreasing refrigerant temperature. This may occur in situations where cooling demand cannot be met by operating a chilled water plant at a particular setting. For example, if cooling demand cannot be met, a set point reset may be used to reset the current refrigerant temperature maintained by the operational strategy to a new value. To illustrate, the refrigerant temperature maintained by an operational strategy at an output of the evaporator may be reset from 42 degrees to 40 degrees. To produce this lower value, the pressure as controlled by the opening and number of open expansion valves is altered. For example, an additional part is operated and/or the flow of refrigerant is slowed. The control of refrigerant temperature may be synchronized with the flow of chilled water and/or the demand by air handling units. For example, the flow rate of chilled water may be increased to maintain the new Delta T value across one or more chilled water plant components. The increased flow rate provides additional chilled water to chilled water plant components, which in turn provides increased cooling output to meet demand. For example, increased chilled water flow to air handlers would give the air handlers additional cool air capacity.

Figure 5:
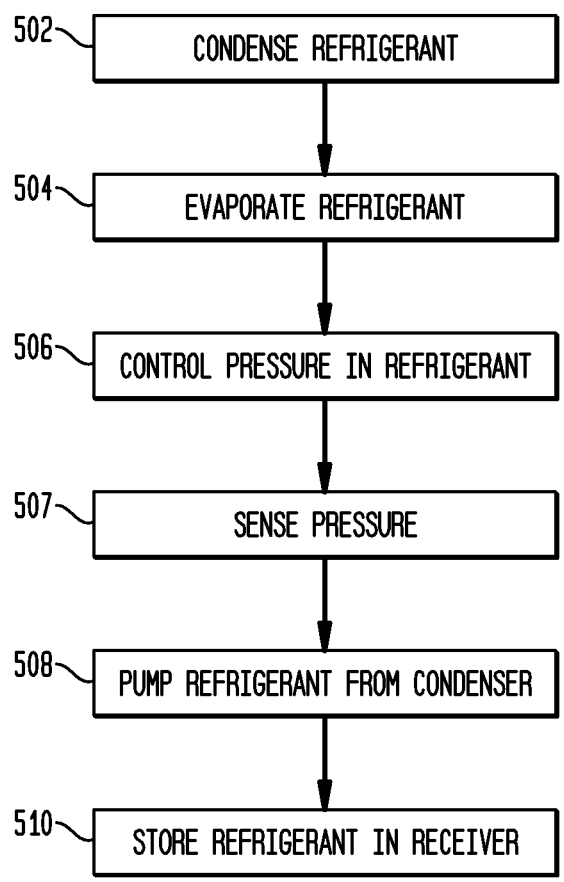
FIG. 5 is a flow diagram of one embodiment of a method for control of a refrigerant pump in an air cooled chiller.

FIG. 5 shows one embodiment of a method for controlling and/or using an air cooled chiller. In particular, control of the refrigerant pump to avoid stacking is shown. The method is performed by a controller (e.g. 302) using sensors (e.g. 310, 316 and 320, or 326), settings, and/or controllable components (e.g., pumps, motors, and/or valves). The method is performed in the order shown or a different order. For example, the condensing, evaporating, and compression through pressure control of acts 502, 504, and 506 are performed at a same time in an on-going manner. Acts 508 may be performed periodically or at triggered times during the on-going operation of the chiller. The storage in the receiver of act 510 also occurs in an on-going manner or may only occur when act 508 also occurs.

In act 502, refrigerant is condensed in a condenser 204. By exposing refrigerant vapor under pressure to cooler temperatures, the refrigerant transitions to a liquid state by condensation. Air is passed by or in coils separating the air from the refrigerant. The air is cooler due to the compression or pressure of the vapor, resulting in condensation.

In act 504, refrigerant is evaporated in an evaporator 206. Liquid refrigerant is exposed to heat from a load. The heat transfers to the refrigerant, causing a transition to vapor.

The amount of condensation and/or evaporation is controlled by control of the pressure of the refrigerant. In act 506, a compressor 202 increases the density of the refrigerant vapor, causing a rise in the refrigerant temperature as well as pressure within the refrigerant loop. The operation of the compressor 202 controls, in part, the pressure of the refrigerant within the compressor and elsewhere in the refrigerant loop 200. The refrigerant pump 205, expansion 214, 315 valve settings, and/or solenoid valve 216, 322 (e.g., via 310 and/or 316) settings may also control pressure, such as by restricting flow.

In act 507, pressure is sensed. The pressure in the condenser, in the evaporator, and/or in other parts of the refrigerant loop is sensed. In one embodiment, the pressure lift or pressure difference between the condenser and the evaporator is sensed. The pressure between the condenser and evaporator of liquid and/or vapor refrigerant is sensed.

In act 508, liquid refrigerant is pumped. The refrigerant is drawn from the condenser 204 and pumped towards the evaporator 206. Any amount or pumping force may be used. In one embodiment, the control is whether to pump or not. In other embodiments, the control may also include how forcefully to pump (e.g., pump speed or pressure).

The pumping occurs when the lift or pressure between the condenser and evaporator is above a threshold. The pressure sensed in act 507 is used to control the pumping. For example, if the pressure difference is 80 psi or greater, then the pumping of act 508 is performed. Otherwise, pumping is not performed and the refrigerant bypasses the pump. The pump is isolated for the bypass by opening a bypass valve.

In act 510, the refrigerant is stored in a receiver 212. During pumping, the receiver acts to protect the evaporator from undesired refrigerant pressure. Some of the refrigerant is stored, at least temporally, in the receiver. During bypass operation, the refrigerant passes through the receiver. The storage is temporary. Any overflow of refrigerant passes to the evaporator 206. The pressure of the refrigerant causes flow through the receiver to the evaporator.

Figure 6:
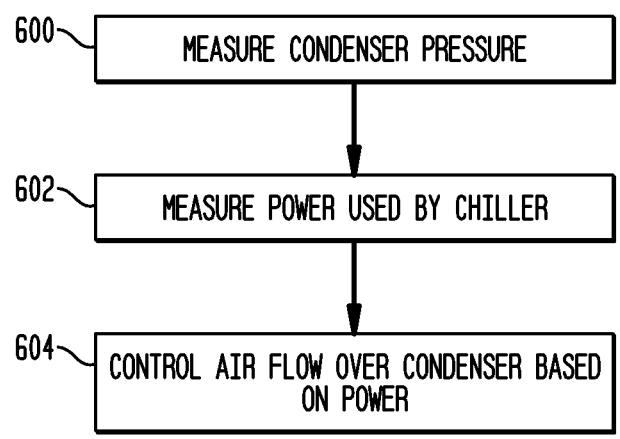
FIG. 6 is a flow diagram of one embodiment of a method for control of a condenser fan of an air cooled chiller.

FIG. 6 shows one embodiment of a method for controlling and/or using an air cooled chiller. In particular, control of the condenser fan 218 in an air cooled chiller is shown. The method is performed by a controller using sensors, settings, and/or controllable components (e.g., pumps, motors, and/or valves). The method is performed in the order shown or a different order. Acts 600, 602 and 604 are performed periodically, such as every five minutes.

In act 600, the pressure in the condenser 204 is measured. The vapor pressure of the condenser 204 is measured, such as the pressure of the refrigerant vapor input from the compressor. Since the condensation actions reduce the pressure, the vapor pressure is responsive to the amount of condensation. The pressure is measured as feedback on the condensation.

In act 602, the power used by the air cooled chiller is measured. A power meter 308 measuring the electrical power used by one or more components of the chiller and/or chilled water plant is measured. For example, a power meter connection to mains or a power meter inserted between the electrical source and the chiller components measures the energy used. The condenser fan 218, compressor 202, and refrigerant pumps 208 represent steady or periodically used consistent power drains. By measuring an average power over time, such as over minutes or hours, the burden on the air cooled chiller is indicated. Since the ambient conditions, such as air temperature, sunlight, and/or wind, most strongly affect the amount of power used, the power measure may be a feedback indication of ambient conditions.

In act 604, the fan speed of the condenser fan 218 is adjusted. The fan speed is increased, decreased, or maintained. Where more power is being used, then the fan speed is increased to provide more air flow through the condenser 204, resulting in more condensation. For example, more power by the chiller is used where the ambient temperature increases or sunlight is shining on the condenser 204. The fan speed is increased to provide more air flow in these conditions. When the sun sets or goes behind clouds, less power is used so the fan speed may be decreased. Where less power is being used, then the fan speed may be decreased to provide less air flow, resulting in less condensation. The condenser pressure may be used separately to further adjust or may be used in combination with power using any function to determine when and by how much to adjust.

Any step size or adjustment amplitude may be used. For example, the fan speed is increased by 5% for each adjustment and the inputs are used to determine whether to adjust. As another example, the inputs are used to determine how much to adjust or to determine a fan speed setting that may or may not be different than previously used based on the fan speed.

By adjusting the air flow, the condensation rate changes or stays the same where ambient condition changes would result in less or more condensation. The air flow affects the energy exchange from the refrigerant vapor to the air. Controlling the fan speed may result in less power usage by the fan and/or other components of the chiller. As a result of changing the air flow, the pressure of the refrigerant vapor in the condenser 204 changes. The change may cause less or more liquid refrigerant to flow to the evaporator 206.

Figure 7:
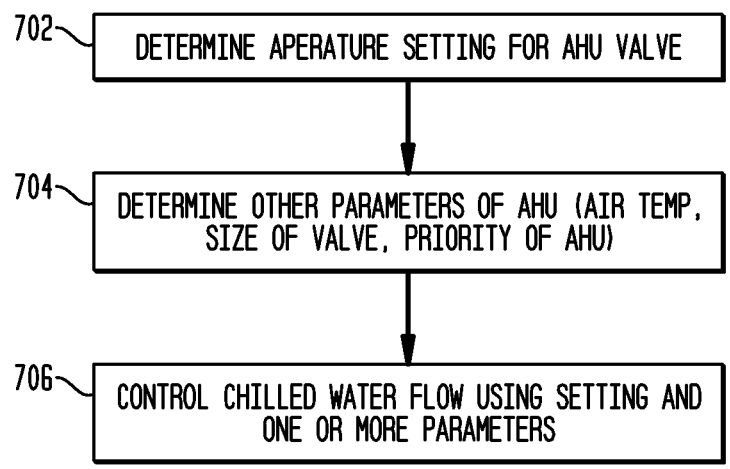
FIG. 7 is a flow diagram of one embodiment of a method for control of chilled water flow.

FIG. 7 shows one embodiment of a method for controlling and/or using an air cooled chiller. In particular, control of the chilled water flow in a chilled water system using an air cooled chiller is shown. The control of the chilled water flow using air handling unit valve setting is as taught using Demand Flow in U.S. Published Patent Application No. 2011/0301766. The method of FIG. 7 adds consideration of other load information, such as including one or more of air temperature at the air handling unit, size of the valve at the air handling unit, and priority of the air handling unit relative to other air handling units. By using the valve setting or position in addition to other load information, more precise or optimized control of chilled water flow is provided.

The method is performed by a controller using sensors, settings, and/or controllable components (e.g., pumps, motors, and/or valves). The method is performed in the order shown or a different order. Acts 702 and 704 are performed at a same time or in any order.

In act 702, the setting of valves 324 for one or more air handling units 124 is determined. The determination may be by looking up a control value sent to the air handling unit.

Alternatively, the determination is by receiving an indication from the air handling unit of the setting and/or by querying the air handling unit.

The valve setting represents the aperture size or amount of open or closure of the valve. In one embodiment, the value of the valve setting is a percentage open (e.g., 80% open). Other values may be used, such as a measure of flow area and solenoid control signal. Representative values may be used, such as mapping the valve setting to a scale with any dynamic range.

In act 704, other parameters are determined. The determination is by look-up, receipt, or query. Any other parameters reflective of the load conditions may be used. For example, one, two, or all three of air temperature (e.g., difference from set point), size of a valve, and/or priority of the air handling unit is determined.

The determination may be based on the parameter being determined. For example, a memory 304 local to the controller 302 stores an indication of the importance 328 of each air handling unit. A ranking system may be provided, such as 1-10 where 1 is the highest priority and 10 is the least priority. The rank is established by design or user input. As another example, the size 330 of the valve of the air handling unit is indicated by the air handling unit or is stored based on design or user input. Any measure of size may be used. The air 326 temperature may be sensed at the air handling unit. The air temperature itself is provided to the controller or the air handling unit determines a difference between a temperature set point and a temperature output by the air handling unit. The difference is sent as an indication of air temperature at the air handling unit to the controller.

In act 706, the flow rate of the chilled water through the air handling unit and the air cooled chiller is controlled based on the valve setting 324 and/or other parameters 326, 328, or 330. The flow rate may be increased, decreased, or kept the same, depending on the inputs. The inputs used are the valve setting and one or more other parameters.

Any function combining the inputs may be used. In one embodiment, the inputs are combined by alteration of a base value. For example, the valve setting 324 is a base value. The values of the other parameters 326, 328, or 330 are used to increase or decrease this base value. The base value is adjusted to account for other load information. Any amount of adjustment may be provided. The amount may be binary, such as adjusting up or down if the value of the parameter is beyond a range. The amount may be a function of the value of the other parameter, such as a linear or non-linear adjustment. For example, the amount of adjustment may be different for air handler units of different priority. Higher priority results in an adjustment upward, and lower priority results in an adjustment downward. Average priority results in no adjustment. As another example, greater temperature difference between supplied air and the air temperature set point results in greater adjustment. The size of the valve may be handled like the priority. Other mapping may be used.

The resulting value 234 is used to control the chilled water flow rate. Where more cooling is desired, reflected by greater openings of the valve as modified by other parameters, then more chilled water flow may be desired. The chilled water pumping is increased to increase the flow. Where less cooling is needed, then less flow of the chilled water may be desired. By operating the pump less or providing less flow, less energy may be consumed by the pump.

Since a given air cooled chiller and/or chilled water line may use more than one air handling unit, the control of the flow rate of the chilled water may be set based on the inputs from multiple air handling units. Any combination of inputs may be used. In one embodiment, a high weighted mean is used. The combined values for each air handling unit are averaged across air handling units. The average of the average and the highest of the combined values is used as the control value. Based on the control value, the flow of chilled water is increased by a set amount or an amount that varies depending on the value. A PID or other control loop may be used.

Figure 8:
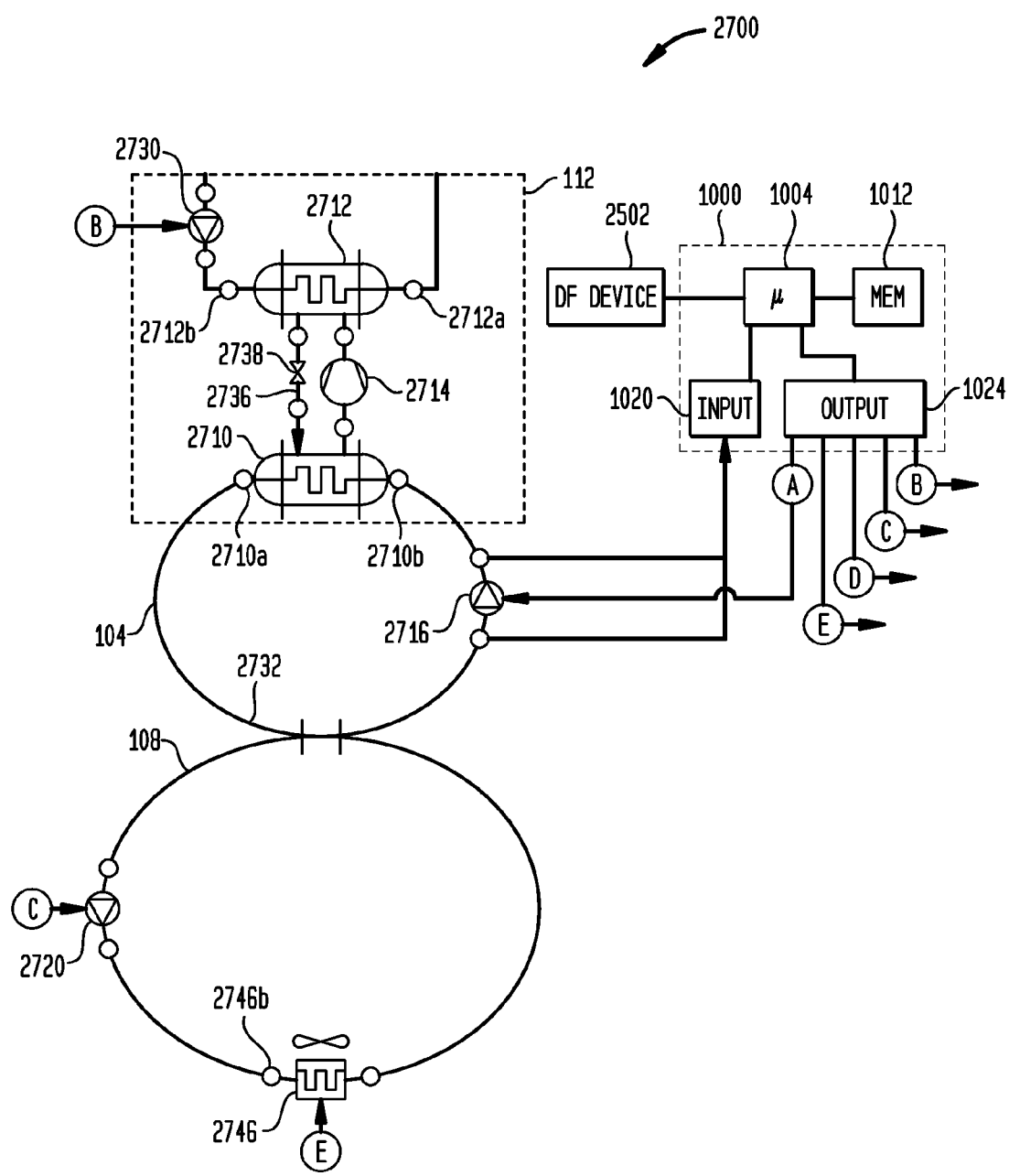
FIG. 8 is a block diagram illustrating an exemplary chilled water plant operable according to the Demand Flow variable pressure curve logic principles.
Figure 9:
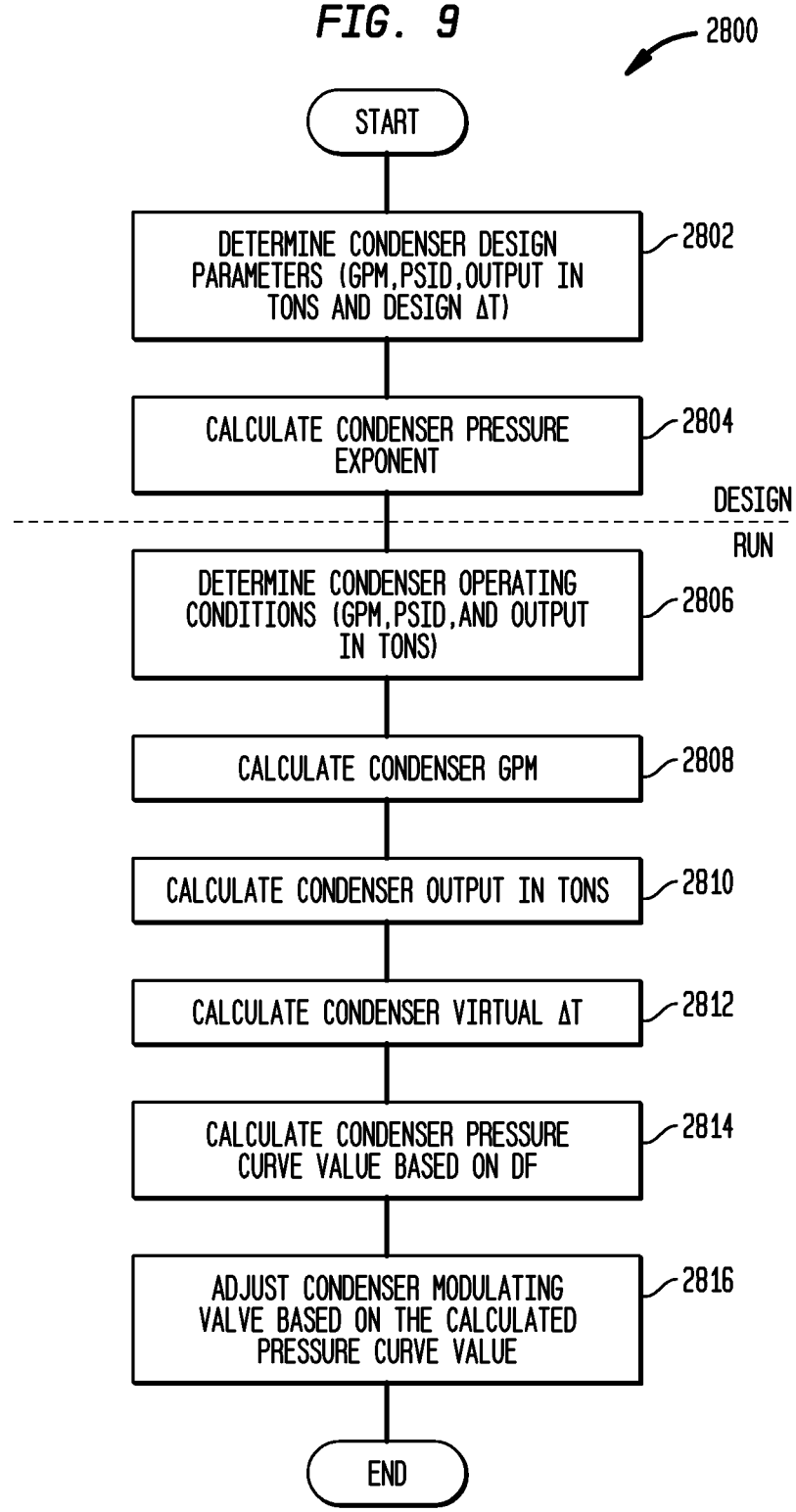
FIG. 9 is a flow diagram illustrating an exemplary Demand Flow condenser routine or algorithm in operation.

In one embodiment, the chilled water flow is varied using a variable pressure curve logic through feedback from the air handling units. FIGS. 8, 9 and 11 illustrate, respectively, the exemplary chilled water plant 2700 configured to operate in conjunction with a demand flow device 2502, and algorithms and processes for determining optimal pressure setpoints associated with the condenser and evaporator operable therein. FIG. 12 illustrates an algorithm and process for calculating the operating pressure exponent utilized by the condenser and evaporator routines discussed and disclosed herein.

FIG. 8 illustrates the exemplary chilled water plant 2700 including a primary loop 104 and the secondary loop 108. The components of the exemplary chilled water plant are shown herein coupled to or in communication with the controller 1000 and the demand flow device 2502. The chiller 112, in fluid communication with the primary loop 104, comprises the condenser 2712, the compressor 2714 and the evaporator 2710 coupled via refrigerant lines 2736 and expansion valve 2738. The evaporator 2710 may be connected to a primary or other loop of a chilled water plant by one or more chilled water lines 2732. The demand flow device 2502, via the controller 1000, executes a demand flow control routine to control the operation of, for example, the compressor 2714, a condenser fan 2730, and water pumps 2716 and 2720 operable in the primary and secondary loops, respectively.

In this exemplary embodiment, the demand flow control routine receives, via the processor 1004, memory 1012 and input 1020; sensor data and communicates each of the subsequently calculated optimal pressure control setpoints to the compressor and water pumps operable within the chilled water plant 2700. FIG. 8 depicts the demand flow device 2502 communicating an optimal pressure setpoint A to the water pump 2716. Similarly, the condenser fan 2730 (where the symbol 2730 in FIG. 8 has been generalized to represent a motor, similar to the motors for pumps 2716 and 2720) controlling or adjusting the pressure within the chiller 112 receives an optimized pressure setpoint B. Secondary and tertiary water pumps such as the exemplary water pump 2720 will likewise receive optimized pressure setpoints (represented by the reference identifier "C"). By controlling the delta T between the chiller 112 and the primary and secondary fluid loops, the operation of the air handling unit 2746 may be controlled and adjusted to similarly optimize their performance and energy usage as indicated by the reference identifier "E."

Sensor data related to measured and operational parameters occurring throughout the chilled water plant 2700 may be detected by the sensors 2714a, 2714b, 2730a, 2730b, 2716a, 2716b, 2720a and 2720b deployed at the appropriate supply and return points adjacent to the compressor 2714, the condenser air fan 2730, and the water pumps 2716 and 2720, respectively. The detected sensor data may, in turn, be communicated to the input 1020 for use by the processor 1004 (and stored when applicable in the memory 1012 and specifically the memory stack 2506).

In this manner, the demand flow device 2502 evaluates each of the components operable within the chilled water plant 2700 based on design characteristics, measured operational performance and current load requirements. The demand flow control routine operable within the demand flow device 2502 then calculates in real-time or near real-time (e.g., every 5 minutes) an optimal pressure setpoint for each of the components to control the flow rate and ultimately regulate the delta T across each of the components in order to implement the demand flow variable pressure curve logic operational strategy.

Demand flow variable pressure curve logic (VPCL) as implemented by the demand flow control routine optimizes the total system energy of the chilled water plant 2700 by synchronizing the operation of the individual components operating therein. In particular, the individual components are synchronized to a calculated efficiency curve relative to the current environmental/load condition sensed via the sensors 2714a, 2714b, 2730a, 2730b, 2716a, 2716b, 2720a and 2720b.

In order to maximize user comfort and optimize system efficiency, the demand flow control routine utilizes a comprehensive optimization algorithm and process to minimize the energy usage of the chiller 112. Demand flow variable pressure curve logic varies provides the mechanism by which the energy usage is controlled by optimizing the pressure setpoints of the compressor 2714, and pumps 2716, 2720 and 2730 which, in turn, allows for the control of the water temperature and flow rate throughout the chilled water plant 2700.

FIGS. 9 and 11 illustrate exemplary algorithms and processes for determining optimal pressure setpoints associated with the condenser and evaporator that may be implemented by the demand flow device 2502 and the demand flow control routine. FIG. 9 is an operational flowchart 2800 of the procedures, steps and tasks that may be implemented by the demand flow control routine, and more particularly a demand flow condenser routine portion of the demand flow control routine, in order to optimize the performance and efficiency of the condenser 2712 (see FIG. 8).

An initial step or task undertaken to utilize the principles of the disclosed demand for variable pressure curve logic is to identify and review the design parameters of the one or more components operating with interconnection with the chilled water plant 2700. For example, prior to beginning implementation of the disclosed optimization algorithm and routine, the user or designer may input or provide the one or more design parameters to the memory 1012 or any other accessible database or storage location (block 2802). The design parameters may include: the design condenser flow rate (GPM); the condenser design pressure differential (PSID); the design condenser capacity (Tons). The design parameters may further include the baseline or design chilled water delta T that represents the full load chilled water delta T calculated at the time commissioning of the chilled water plant 2700. These initial design parameters provide the demand flow processor, or more specifically the demand flow condenser routine, with a baseline performance envelope against which the condenser 2712 may be evaluated.

The demand flow control routine and the demand flow condenser routine are further configured, as shown at block 2804, to empirically calculate an operating pressure exponent (P Exponent) based on measured parameters of the condenser 2712 operating in the chiller 112. In this exemplary embodiment, the operating pressure exponent is calculated according to the formula:

$$P\ \text{Exponent} = Ax^2 + Bx + C$$

where x is the delta P or pressure change measured across the condenser 2712 (see block 2804) and the constants A, B and C are calculated for each chilled water plant 2700. Other formulas may be used. This relationship is discussed in more depth in connection with FIG. 12. In particular, FIG. 12 illustrates a pressure exponent algorithm and routine 3000 that may be utilized to empirically derive discrete pressure exponents and an overall pressure exponent curve that fits or otherwise connects each of the discrete pressure exponents. The overall pressure exponent curve, and more particularly, the equation describing the overall exponent pressure curve, in turn, is utilized by the condenser routine to determine the operating pressure exponent shown above.

As the pressure exponent routine 3000 initializes, the delta P or pressure differential (PSID) across the condenser 2712 is measured at a variety of fan speeds specified at the condenser fan 2730. For example, the pressure exponent routine 3000 records the fan speed in Hertz (Hz) and the pressure differential (PSID) across the condenser 2712 when the condenser fan 2730 is operating at a partial load value (PLV) corresponding to 25%, 50%, 75% and 100% pumping capacity (block 3002). The pressure exponent for each discrete partial load value (PLV) is calculated as a function of the maximum operation pressure differential (PSID) of the system, the fan speed in Hertz and the measured operating pressure differential at a given PLV. The formula for calculating one of the discrete P Exponents for a given PLV is:

$$PLV\ \text{Operating}\ PSID = \text{Max. Operating}\ PSID * \left(\frac{\text{Pump Speed(Hz)}}{60}\right)^{P\ Exponent_{PLV}}.$$

Other formulas may be used.

The maximum operating pressure differential (PSID) is a known design value, and the fan speed (Hz) and the operating pressure differential (PSID) are measured and/or empirically derived values. In this way, it is possible to calculate a discrete pressure exponent (P Exponent$_{PLV}$) for each set of variables associated with a given partial load value (PLV). Stated another way, by balancing the left and right sides of the above-formula, the discrete pressure exponent (P Exponent$_{PLV}$) can be derived for a given partial load value (e.g., 25%, 50%, 75% and 100% capacity) and measured operating pressure differential at the given PLV (block 3004). The resulting the discrete pressure exponents (P Exponent$_{PLV-25\%}$, P Exponent$_{PLV-50\%}$, P Exponent$_{PLV-75\%}$, and P Exponent$_{PLV-100\%}$) may be plotted according to the measured operating pressure differential in order to define the overall pressure exponent curve. The equation describing the overall exponent pressure curve (block 3006) can be derived based on these plotted values.

Once the equation describing the overall exponent pressure curve has been derived, the pressure exponent routine 3000 completes and returns to the operational flowchart 2800. At this point, the equation describing the overall exponent pressure curve may be utilized by controller 1000 to calculate the operating pressure exponent for any given pressure differential (PSID). An exemplary overall exponent pressure curve equation may be defined as:

$$P\ \text{Exponent} = -0.00003x^2 + 0.0031x + 1.9358$$

where x is the delta P or pressure change measured across the condenser 2712 (see block 2804) and the constant A equals −0.00031, the constant B equals 0.0031 and the constant C equals 1.9358.

This portion of the demand flow condenser routine, implemented by the controller 1000, may be considered the design or configuration portion of the routine while the remaining steps and operations may be characterized as the run or operational portion of the routine.

The demand flow condenser routine utilizes the sensors 2712a and 2712b to detect and measure the pressure differential (PSID) across the condenser 2712. In this embodiment, the sensors 2712a and 2712b may be water immersion sensors specified with a suitable range (e.g. 20°-120° F.) to measure the refrigerant delta T. In other embodiments and configurations, the temperature sensors may be high or higher accuracy sensors (±0.5° F.) arranged to detect minor variations in the condenser and/or chilled water flow throughout portions of the chilled water plant 2700. Moreover, the demand flow control routine sensors 2712a and 2712b and/or components or subsystems thereof may be configured and arranged to measure a chilled water supply (CWS) temperature (sensor 2712a) and the chilled water return (CHR) temperature (sensor 2712b) associated with the condenser 2712 (at block 2806).

The demand flow condenser routine may subsequently utilize the detected and measured pressure and temperature information to calculate a fan speed for the condenser 2712 (at block 2808). In particular, the demand flow processor 2502 accesses the values stored in, for example, the memory 1012 if previously accessed and stored locally) as directed by the demand flow control routine. The condenser fan speed is calculated according to the formula:

$$\textit{Meas. Condenser Flow Rate} = T\&B \text{ speed} * \left(\frac{\textit{Meas. Condenser } \Delta P(PSID)}{\textit{Design Condenser } \Delta P(PSID)}\right)^{.5}$$

where the test & balance (T&B) speed represents the actual speed of the fan. This is usually different that the "design" or full-rated speed due to the variance in manufacture and installation. As previously discussed, the sensors 2712a and 2712b may be high accuracy pressure sensors arranged to measure the supply pressure (via sensor 2712a) and the return pressure (via 2712b). The difference between the measured supply and return pressures represents the pressure differential or loss across the condenser 2712.

Upon determination of the measured condenser fan speed, the demand flow condenser routine and the demand flow control routine (as shown at block 2810) calculate the current condenser output capacity (Tons). The current condenser capacity may be calculated according to the formula:

$$\textit{Condenser Capacity(Tons)} = \textit{Meas. Condenser Flow Rate} * \left(\frac{CWR - CWS}{24}\right)$$

In this way, the demand flow condenser routine portion of the demand flow control routine can empirically calculate the output capacity each condenser 2712 operating in conjunction with the chilled water plant 2700.

The demand flow control routine and the demand flow condenser routine may, in turn, utilize the results from the previous steps and calculations to determine a virtual delta T (see block 2812). The virtual delta T represents a hypothetical or equivalent chilled water delta T that would be present if a constant volume pumping algorithm were utilized under the current operating conditions. The virtual delta T may be calculated according to the formula:

$$\textit{Virtual Delta } T = \textit{Design Delta } T * \left(\frac{\textit{Condenser Capacity(Tons)}}{\textit{Design Condenser Capacity(Tons)}}\right).$$

The demand flow control routine and the demand flow condenser routine may, at block 2814, utilize the results and information from one or more of the preceding algorithm steps to determine a pressure curve set point for the condenser 2712. The pressure curve setpoint may be determined according to the formula:

$$\textit{PC Setpoint} = \textit{Design Condenser } \Delta P(PSID) * \left(\frac{\textit{Virtual Delta } T}{\textit{Baseline Delta } T}\right)^{P\ Exponent}$$

where the baseline delta T represents the full load delta T chosen or selected at the time of commissioning of the chilled water plant 2700. The baseline delta T may (and often will) correspond to the design delta T. Other formulas may be used.

In another embodiment, the demand flow control routine and, in particular, the demand flow condenser routine, at block 2814, may utilize the parameters and information from one or more of the preceding algorithm acts in conjunction with the measured active pressure differential (PSID) value to directly determine the pressure curve set point for the condenser 2712. The pressure curve setpoint according to this alternate embodiment may be determined according to the formula:

$$\textit{PC Setpoint} = \textit{Active Condenser } \Delta P(PSID) * \left(\frac{\textit{Measured Delta } T}{\textit{Design Delta } T}\right)^{P\ Exponent}.$$

Other formulas may be used.

The calculated pressure curve set point may, in turn, be communicated from the demand flow control routine and demand flow processor via the communications module to the fan 2730 (see block 2816). During operation, if the temperature of the condenser air detected by the sensor 2712b rises above or exceeds a threshold level corresponding to, for example, the supply chilled water temperature setpoint plus a small deadband temperature (e.g. 1° F.), then the demand flow device 2502 and the demand flow control routine initiates an override to linearly increase or ramp up the VFD associated with the condenser fan 2730 to full speed. When the temperature of the chilled water exceeds the threshold, a loss of communication occurs as the temperature surpasses the sensor's ability to detect the temperature. The subsequent increased flow rate provided by the ramped up VFD limits additional heat transfer, thereby causing the temperature to decline and communications to be restored. The VFD may further be programmed to initiate a deceleration ramp after, for example, 15 min. at full speed.

Figure 10:
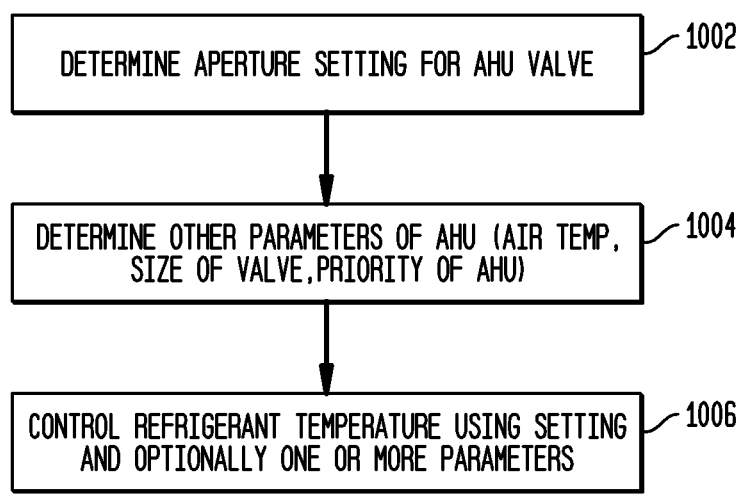
FIG. 10 is a flow diagram of one embodiment of a method for control of refrigerant temperature.

Referring to FIG. 10, the refrigerant temperature set point for the evaporator is controlled. The refrigerant set point in the evaporator will change. The expansion valve resets the evaporator set point. The set point is varied to meet load conditions in conjunction with varying the set point of the chilled water temperature and to allow for proper refrigerant flow from the condenser. To be responsive to the load, the refrigerant set point is a function of information from the air handling unit, such as the setting 324 for the air handling unit valve position. Other parameters are optionally used, such as the air temperature 326 (e.g., difference in supplied verses desired), importance 328 of the air handling unit, and/or valve size 330.

FIG. 10 shows one embodiment of a method for controlling and/or using an air cooled chiller. In particular, control of the evaporator temperature set point in an air cooled chiller is shown. The control of the refrigerant set point is as taught using Demand Flow in U.S. Published Patent Application No. 2011/0301766, but with added consideration of the load (e.g., air handling unit) information. The method of FIG. 10 adds consideration of the load information, such as including one or more of valve position, air temperature at the air handling unit, size of the valve at the air handling unit, and priority of the air handling unit relative to other air handling units. By using the load information, more precise or optimized control of chilled water flow is provided.

The method is performed by a controller using sensors, settings, and/or controllable components (e.g., pumps, motors, and/or valves). The method is performed in the order shown or a different order. Acts 1002 and 1004 are at a same time or in any order. Additional, different, or fewer acts may be performed. For example, act 1004 is not performed.

In act 1002, the setting of valves for one or more air handling units is determined. The determination may be by looking up a control value 324 sent to the air handling unit. Alternatively, the determination is by receiving an indication from the air handling unit of the setting and/or by querying the air handling unit.

The valve setting 324 represents the aperture size or amount of opening or closure of the valve. In one embodiment, the value of the valve setting is a percentage open. Other values may be used, such as a measure of flow area and solenoid control signal. Representative values may be used, such as mapping the valve setting to a scale with any dynamic range.

In act 1004, other parameters are determined. The determination is by look-up, receipt, or query. Any other parameters reflective of the load conditions may be used. For example, one, two, or all three of air temperature 324, size of a valve 330, and/or priority of the air handling unit is determined.

The determination may be based on the parameter being determined. For example, a memory local to the controller stores an indication of the importance 328 of each air handling unit. A ranking system may be provided, such as 1-10 where 1 is the highest priority and 10 is the least priority. The rank is established by design or user input. As another example, the size of the valve of the air handling unit is indicated by the air handling unit or is stored based on design or user input. Any measure of size may be used. The air temperature may be sensed at the air handling unit. The air temperature itself is provided to the controller or the air handling unit determines a difference between a temperature set point and a temperature output by the air handling unit. The difference is sent as an indication of air temperature at the air handling unit to the controller.

In act 1006, the refrigerant temperature set point is controlled based on the valve setting 324 and/or other parameters 326, 328, or 330. The temperature set point may be increased, decreased, or kept the same, depending on the inputs. Any function combining the inputs may be used. In one embodiment, the inputs are combined by alteration of a base value, as discussed above.

The resulting value is used to control the refrigerant temperature. By opening or closing expansion valves, the dwell time of refrigerant in the evaporator is changed. The pressure varies. The expansion valves are controlled to alter the amount of energy transfer, and thus the refrigerant temperature. For example, more parts of the evaporator are activated to provide a greater increase in temperature of the refrigerant. To provide for a relatively lower refrigerant temperature, one or more parts of the evaporator are turned off (e.g., expansion valves closed). Other than binary control (e.g., expansion valves partially open) may be used.

Since a given air cooled chiller and/or chilled water line may use more than one air handling unit, the control of the flow rate of the chilled water may be set based on the inputs from multiple air handling units. Any combination of inputs may be used. In one embodiment, a high weighted mean is used. The combined values for each air handling unit are averaged across air handling units. The average of this average and the highest of the combined values is used as the control value. Based on the control value, the expansion valves and corresponding refrigerant temperature are varied by a set amount or an amount that varies depending on the value. A PID or other control loop may be used.

In one embodiment, the refrigerant temperature is varied using variable pressure curve logic through feedback from the air handling units. By controlling pressure, the refrigerant evaporates at a specific temperature. This refrigerant gas also changes temperature somewhat. Both the evaporation of the liquid refrigerant and the warming of the refrigerant gas are used to cool the water down.

FIG. 11 illustrates an example algorithm and process for determining optimal refrigerant temperature setpoint associated with the evaporator. FIG. 12 illustrates an algorithm and process for calculating the operating pressure exponent utilized by the condenser and evaporator routines discussed and disclosed herein.

FIG. 11 is an operational flowchart 2900 for implementing variable pressure curve logic operational strategy by the demand flow control routine, and more particularly a demand flow evaporator routine portion of the demand flow control routine, in order to optimize the performance and efficiency of the evaporator 2710 (see FIG. 8).

In the design portion or stage of the demand flow evaporator routine receives and organizes one or more design parameters in the memory 1012 or any other accessible database or storage location (as shown at block 2902). The design parameters may, as previously discussed, include: a design evaporator flow rate (GPM); an evaporator design pressure differential (PSID); the design evaporator capacity (Tons); a baseline or design chilled water delta T that represents the full load chilled water delta T calculated at the time commissioning of the chilled water plant 2700. In another embodiment, the organized design parameters can be supplemented with or augmented by a current or active pressure differential (PSID) value measured across the evaporator 2710. Utilizing these design and/or measured parameters, the performance envelope against which the evaporator 2710 is to be evaluated may be established by the demand flow processor and the demand flow evaporator routine.

An evaporator-specific pressure exponent (P Exponent) may be empirically-derived and calculated by the demand flow control routine and, in particular, the demand flow evaporator routine. The pressure exponent (P Exponent) may be based on measured parameters of the evaporator 2710 operating in the chiller 112. The pressure exponent may be calculated according to the formula:

$$P \text{ Exponent} = Ax^2 + Bx + C$$

where x is the delta p or pressure change measured across the evaporator 2710 (see block 2904) and the constants A, B and C are calculated for each chilled water plant 2700. Other formulas may be used. As previously discussed in connection with the condenser 2730, FIG. 12 illustrates a pressure exponent algorithm and routine 3000 that may be utilized to empirically derive discrete pressure exponents and an overall pressure exponent curve that fits or otherwise connects each of the discrete pressure exponents. The overall pressure exponent curve, and more particularly, the equation describing the overall exponent pressure curve, in turn, is utilized by the evaporator routine to determine the operating pressure exponent shown above.

Once the equation describing the overall exponent pressure curve has been derived, the pressure exponent routine 3000 completes and returns to the operational flowchart 2900. At this point, the equation describing the overall exponent pressure curve may be utilized to calculate the operating pressure exponent for any given pressure differential (PSID) as discussed previously.

The demand flow evaporator routine begins the operational or run portion of the routine by utilizing the sensors 2710a and 2710b to detect and measure the pressure differential (PSID) across the evaporator 2710. The sensors 2710a and 2710b and/or components or subsystems thereof may further be configured and arranged to measure a chilled water supply (CWS) temperature (sensor 2710a) and the chilled water return (CHR) temperature (sensor 2710b) associated with the evaporator 2710 (at block 2906).

The demand flow evaporator routine, in turn, calculates a flow rate (GPM) through the evaporator 2710 (at block 2908) based on the detected and measured pressure and temperature information. In particular, the demand flow processor accesses the detected values stored in, for example, the memory as directed by the demand flow control routine. The evaporator flow rate is be calculated according to the formula:

$$\text{Meas. Evaporator Flow Rate} = T\&B\ GPM * \left(\frac{\text{Meas. Evaporator } \Delta P(PSID)}{\text{Design Evaporator } \Delta P(PSID)}\right)^{.5}$$

where the T&B GPM represents the full flow evaporator flow rate. Other formulas may be used. As previously discussed, the sensors 2710a and 2710b may be high accuracy pressure sensors such arranged to measure the supply pressure (via sensor 2710a) and the return pressure (via 2710b). The difference between the measured supply and return pressures represents the pressure differential or loss across the evaporator 2710.

Upon determination of the measured evaporator flow rate (GPM), the demand flow evaporator routine and the demand flow control routine may (as shown at block 2910) calculate the current evaporator output capacity (Tons) according to the formula:

$$\text{Evaporator Capacity(Tons)} = \text{Meas. Evap. Flow Rate} * \left(\frac{CWR - CWS}{24}\right)$$

In this way, the demand flow evaporator routine empirically calculates the output capacity each evaporator 2710 (e.g., each evaporator part) operating in conjunction with the chilled water plant 2700.

The demand flow control routine and the demand flow evaporator routine, in turn, utilize the results from one or more of the previous steps and calculations to determine a virtual delta T (see block 2912). As previously discussed, virtual delta T represents an equivalent chilled water delta T that would result if a constant volume pumping algorithm were utilized under the current operating conditions. The virtual delta T may be calculated according to the formula;

$$\text{Virtual Delta } T = \text{Design Delta } T * \left(\frac{\text{Evaporator Capacity(Tons)}}{\text{Design Evaporator Capacity(Tons)}}\right).$$

The demand flow control routine and the demand flow evaporator routine, at block 2914, utilize the results and information from one or more of the preceding algorithm steps to determine a pressure curve set point for the evaporator 2710. The pressure curve setpoint may be determined according to the formula:

$$PC \text{ Setpoint} = \text{Design } Evap.\ \Delta P(PSID) * \left(\frac{\text{Virtual Delta } T}{\text{Baseline Delta } T}\right)^{P\ Exponent}$$

where the baseline delta T represents the full load delta T chosen or selected at the time of commissioning of the chilled water plant 2700. The baseline delta T may (and often will) correspond to the design delta T.

In another embodiment, the demand flow control routine and the demand flow evaporator routine, at block 2914, may utilize the results and information from one or more of the preceding algorithm steps in conjunction with the measured active pressure differential (PSID) value to determine the pressure curve set point for the evaporator 2710. The pressure curve setpoint according to this alternate embodiment may be determined according to the formula:

$$PC \text{ Setpoint} = \text{Active } Evap.\ \Delta P(PSID) * \left(\frac{\text{Measured Delta } T}{\text{Design Delta } T}\right)^{P\ Exponent}.$$

The demand flow evaporator routine and the demand flow control routine may cooperate to implement a critical zone reset portion of the operational strategy (see block 2916) in order to adjust the operation of the chilled water plant 2700 to altered demand requirements. For example, if cooling demand is lowered, then a critical zone reset may alter the operating or current delta T linearly towards the design delta T. In operation, a decrease in demand from the chilled water plant 2700 may trigger a critical zone reset that causes the 15-degree current operating delta T to shift towards the 16-degree design delta T. The inputs from the air handling unit are used to control the refrigerant temperature. Accordingly, the pressure setpoint for one or more pumps operating throughout the chilled water plant 2700 may be decreased in order to decrease the chilled water flow therethrough. The critical zone reset setpoint can be calculated according to the linear formula:

$$Y = M*X + B,$$

where M is the slope of the line as defined by (Y2−Y1)/(X2−X1); X is the current value of the chosen critical zone parameter; and B is the Y-intercept value. The Y-intercept value is selected from the minimum or maximum Y−M* (Min or Max critical zone (CZ) value). The minimum or maximum critical zone (CZ) values are site-specific parameters selected or identified at the time of commissioning of the chilled water plant 2700 and the demand flow device 2502. For example, in one implementation, the humidity within a building or area may be of importance to a user, in this instance the critical zone values may be selected based on measured humidity and/or temperature values in the area of interest. In another embodiment, the sensor 2746b may monitoring the temperature and flow into the air handling unit 2746 in order to determine if and when the supply temperature falls below a threshold or value necessary to provide the desired cooling. In this embodiment, the operation and performance of the air handling unit 2746 may provide the requisite minimum critical zone (CZ) value feedback or control the demand flow device 2502. Other values and parameters may be determined based on the requirements of a specific implementation.

The demand flow evaporator routine and the demand flow control routine may, as indicated at block 2918, determine the temperature at the decoupler or bypass 128 connecting the primary loop 104 and secondary loop 108. The detected temperature difference may, in turn, be utilized to determine the existence of a flow imbalance between the loops 104 and 108. The temperature in the de-coupler 128 ranges between predetermined minimum and maximum temperatures, and the bridge offset may be calculated via a linear equation that adjusts pressure setpoint (as indicated by the reference "C") associated with the water pump 2720 to balance the flow between these loops.

The calculated or critical zone reset pressure curve setpoint may, in turn, be communicated from the demand flow control routine and demand flow processor via the communications module to the pump 2716 (see block 2920). The change in operating pressure of the pump 2716 to the calculated or new pressure curve setpoint alters the pressure and flow rate through the evaporator 2710.

Subsequently, the demand flow control routine, and more particularly a demand flow pump routine portion of the demand flow control routine, may determine (at block 2922) if additional components, pumps, etc. require evaluation and reset. If additional pumps and compressors require evaluation, then the demand flow pump routine calculates a new or optimal pump setpoint for the additional pump (see block 2924). The demand flow pump routine repeats (at block 2926) the calculations for each identified and/or operational pump in the chilled water plant 2700.

Figure 13:
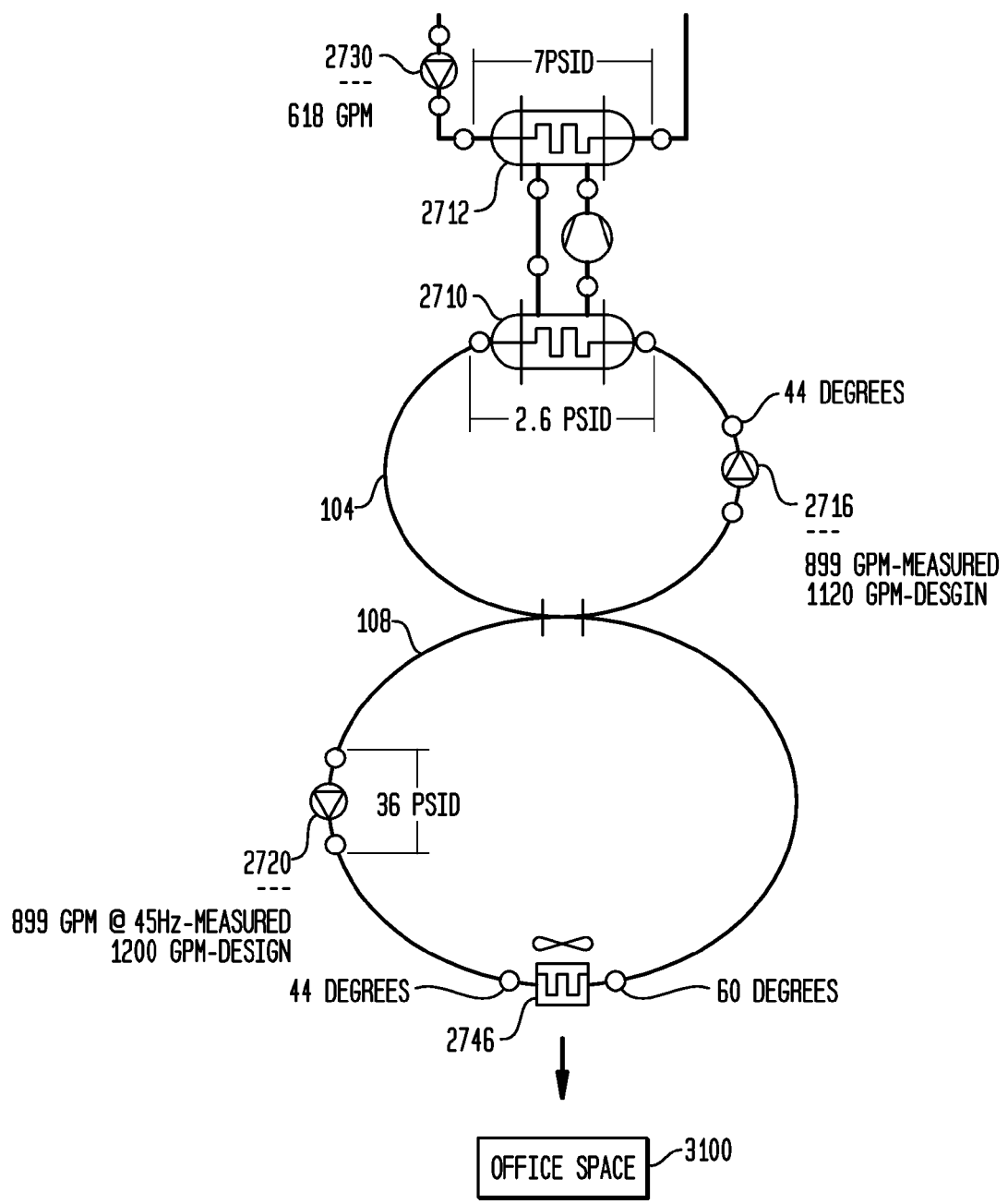
FIG. 13 is a block diagram illustrating the exemplary chilled water plant shown in FIG. 8 operating according to the disclosed Demand Flow variable pressure curve logic principles disclosed herein.

The calculated pressure curve set point(s) may, in turn, be communicated from the demand flow control routine and demand flow processor via the communications module to the remaining pump(s) (see block 2928). To illustrate with a specific example, an exemplary chilled water plant optimized and managed in accordance with Demand Flow variable pressure curve logic is shown in FIG. 13. In the example, the 44 degree chilled water produced in the primary loop 104 is circulating at a flow rate equal to 899 gallons per minute (GPM) to maintain a 2.6 pressure differential (PSID) across the evaporator 2710. Similarly, the secondary loop 108 circulates the chilled water through the secondary pump 2720 at a flow rate 899 GPM (with the VFD driving the secondary pump at 45 Hz) and a 36 PSID. At this flow rate and pressure differential, the air handling unit 2746 receives sufficient chilled water flow to cool the office space 3100 to a desired temperature. The temperature of the chilled water exiting the air handling unit 2746, in this example, increases from 44 degrees to 60 degrees and circulates from the secondary loop 108 back to the primary loop 104. In a similar manner, heat from the 60 degree chilled water is transferred from the evaporator 2710 to the condenser 2712 via a refrigeration cycle established between the two components. The condenser 2712 with the fan 2730 operate to maintain a 618 GPM flow rate and a 7 PSID across the condenser 2712. By balancing the flow rates between these loops as a function of the pressure setpoints associated with the pumps 2716 and 2720 and fan 2730, the evaporator 2710, the condenser 2712 and the air handling unit 2746 may be operated efficiently at flow rates and pressure outside of their original design parameters. This, in turn, provides additional operational flexibility as well as increased efficiency because no one component or element is required to compensate for the inefficient operation of the remaining components under varying demand conditions.

Figure 14:
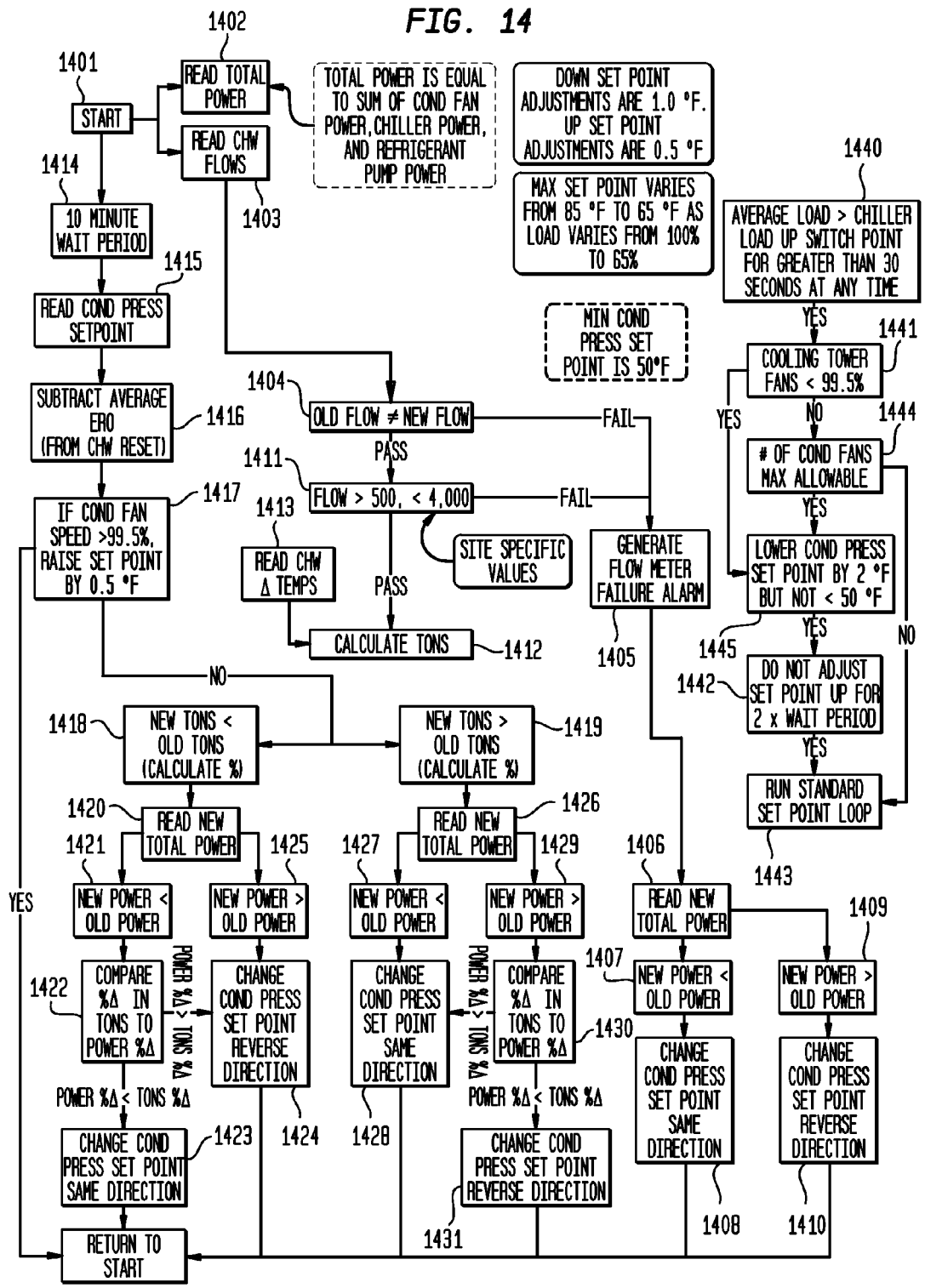
FIG. 14 is a flow diagram illustrating an exemplary routine or algorithm for control of a condenser pressure setpoint.

FIG. 14 shows one embodiment of controlling a pressure set point of the condenser. In this example method (which may be performed by a controller consistent with controller 302 or controller 1000 in communication with demand flow device 2502), adjustments of the set point down and up are handled incrementally, such as at 1.0 for down and 0.5 for up, but other adjustments may be used. The setpoint for temperature is limited between 85 and 65, but other ranges may be used. The temperature range is mapped linearly for loads from 100% to 65%.

In act 1401, the method starts. The total power is read in act 1402. The total power is a sum of the condenser fan, chiller (e.g., compressor), and refrigerant pump powers, but other power measures may be used. In act 1403, the chilled water flow is read. The value of the old or previous flow is compared to the newly read flow in act 1404. If equal, then an alarm is generated in act 1405 and a new total power is read in act 1406. If the new power is less than the old power in act 1407, then the condenser pressure set point is changed in act 1408 in the same direction as the last change in set point. If the new power is more than the old power in act 1409, then the condenser pressure set point is changed in act 1410 in the reverse direction to the last change in set point. This action selects the exact amount of fan energy to use that produces the lowest total energy use.

If the old flow and new flow from act 1404 are equal, the flow is verified to be within a site specific range (e.g., 500-4,000 GPM) in act 1411. If within the range, then the tons of cooling is calculated in act 1412 using chilled water delta T from the chilled water loop temperature sensors and the chilled water flow meter in act 1413. If not within the range, then acts 1405-1408 are performed.

In addition to reading in acts 1402 and 1403, the method waits 10 minutes or other amount of time in act 1414. After waiting 10 minutes in act 1414, the pressure set point for the condenser is read in act 1415. An average evaporator refrigerant offset (ERO) (see FIG. 19) is subtracted from the pressure set point in act 1416. If the fan speed of the condenser is greater than 95.5%, the set point of the condenser pressure is raised by 0.5 degrees in act 1417, and the process returns to act 1401. If the fan speed is less than or equal to 99.5%, the currently calculated tons from act 1412 is compared to previous tons in acts 1418 and 1419. The percent change in tons is calculated. If the new ton value is less than the old ton in act 1418, then a new total power is read in act 1420. If the new power is less than the old power in act 1421, the percent change in tons is compared to percent change in power in act 1422. If the percent change in power is less than the percent change in tons, the condenser pressure set point is changed in the same direction as the previous change in set point in act 1423. If percent change in power is more than the percent change in tons, the condenser set point is changed in reverse direction as the previous change in set point in act 1424. If the new power is greater than the old power in act 1425, then act 1424 is performed.

If the new ton value is greater than the old ton in act 1419, then a new total power is read in act 1426. If the new power is less than the old power in act 1427, then the condenser pressure set point is changed in the same direction as the previous change in set point in act 1428. If the new power is greater than the old power in act 1429, then the percent change in tons is compared to percent change in power in act 1430. If the percent change in power is less than the percent change in tons, the condenser pressure set point is changed in the same direction as the previous change in set point in act 1428. If the percent change in power is more than the percent change in tons, the condenser set point is changed in the reverse direction as the previous change in set point in act 1431.

FIG. 14 also includes an example exception handling. In act 1440, the average power load of the chillers is greater than the chiller load up switch point for more than 30 seconds or other period, then the condenser fan speed is compared to a threshold, such as 99.5%, in act 1441. The load up switch point is the calculated value of compressor power that would require turning on an additional chiller to meet the cooling load. The load up switch point is calculated by dividing the actual compressor power compared to the maximum compressor power. At lower condenser temperatures, the switch up set point is higher (e.g., 75° F. and 99.5%), and at higher condenser temperatures, the switch up set point is lower (e.g., 85° F. and 80%). If the fan speed is less, then the condenser pressure set point is lowered in act 1445, such as by 2 degrees so long as the not being below a value, such as 50 degrees. In act 1442, the adjustment of the set point upwards is prevented for a period, such as two times the 10 minute period of act 1414. The set point control loop of acts 1401-1431 is then performed in act 1443. If the fan speed is greater than the threshold in act 1441, the number of condenser fans being used is read in act 1444. If the number of used fans is less than the maximum number, then act 1445 is performed. If the number is equal in act 1444, the act 1443 is performed.

Figure 15:
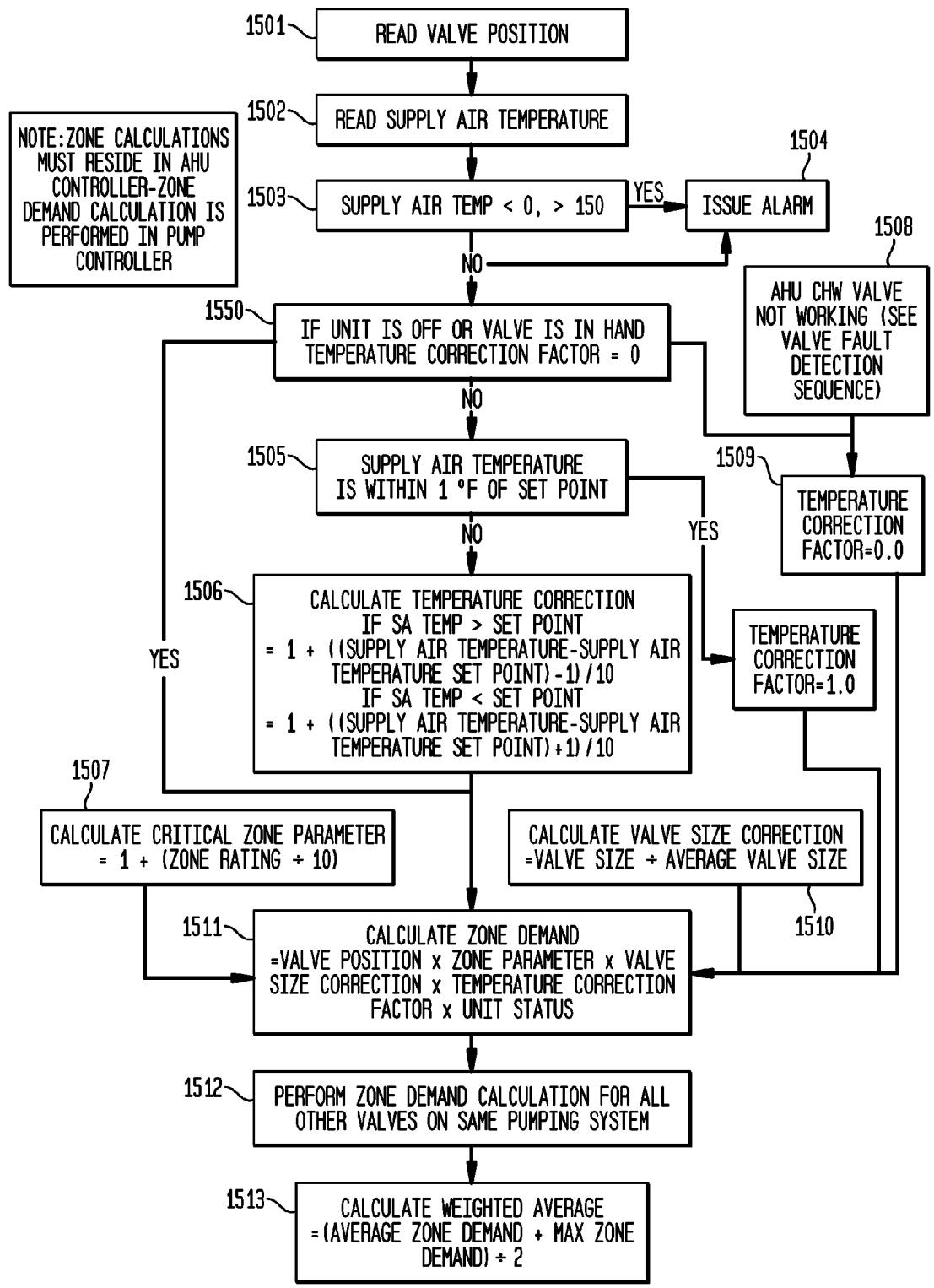
FIG. 15 is a flow diagram illustrating an exemplary routine or algorithm for calculating air handling unit cooling demand.

FIG. 15 shows one embodiment of determining air handling unit demand. The zone calculations are performed by the air handling unit controller, and the zone demand calculations are performed by a pump controller. These controllers are represented in general by the controller 302 or 1000 herein, but may be separate devices in communication with each other.

In act 1501, the position of the value is read. The air supply temperature is read in act 1502. If the air supply temperature is outside a range (e.g., 0-150 degrees) as compared in act 1503, then an alarm is generated in act 1504. In either case, a temperature correction factor is set to 0 if the air handler unit is off or the value is in hand (i.e., overridden by the operator to the On position) in act 1550. If not, the supply air temperature is checked for being within a threshold amount (e.g., 1 degree) of the air temperature set point in act 1505. If within, then the temperature correction factor is set to 1.0. If not, then the temperature correction factor is calculated as 1+((supply air temperature−supply air temperature set point)−$\frac{1}{10}$) when the supply air temperature is greater than the set point and as 1+((supply air temperature−supply air temperature set point)+$\frac{1}{10}$) if the supply air temperature is less than the set point in act 1506.

In act 1507, the critical zone parameter is calculated as 1+(zone rating/10). In act 1508, the air handling unit valve is checked for proper function. If not working, then the temperature correction factor is set to 0.0 in act 1509. In act 1510, the valve size correction is calculated as valve size/average valve size for the air handling units sharing chilled water.

In act 1511, the zone demand is calculated as the valve position×the zone parameter×valve size correction×temperature correction factor×unit status. In act 1512, the zone demand calculation is performed for all of the other valves on the same pumping system (e.g., air handling units sharing chilled water). In act 1513, the weighted average is calculated as (average zone demand+maximum of the zone demands)/2. This action ensures that only the required amount of water is pumped from the chillers, keeping the pumping energy use to a minimum and reducing dehumidification at the air handling units.

Figure 16:
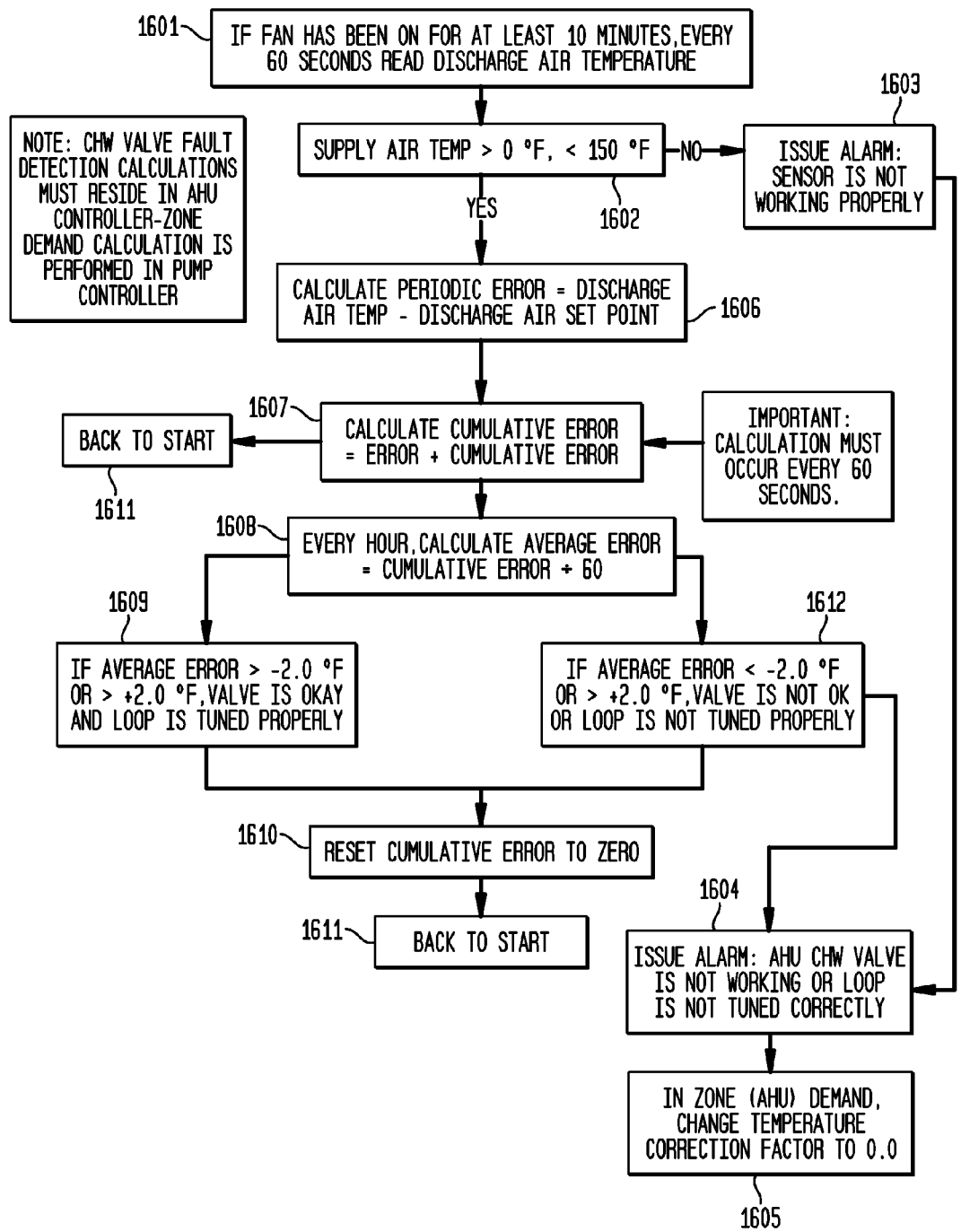
FIG. 16 is a flow diagram illustrating an exemplary routine or algorithm for fault detection in an air handling unit valve.

As previously noted as part of performing the method or process depicted in FIG. 15 for determining air handler unit demand, the proper function of the air handling unit valve is checked (i.e., fault detection performed) in act 1508. FIG. 16 shows one embodiment of a method or process for air handling unit valve fault detection. The valve fault detection is performed by the air handling unit controller, and the zone demand calculation is performed by the pump controller. These controllers are represented in general by the controller 302 or 1000 herein, but may be separate devices in communication with each other.

In act 1601, the discharge air temperature at the air handling unit is read periodically (e.g., every 60 seconds) if the fan of the air handling unit being on for a period, such as 10 minutes. In act 1602, the supply air temperature is checked to be within a range, such as 0-150 degrees. If outside the range, an alarm is generated in act 1603 as the sensor may not be working. An alarm indicating that the air handling unit chilled water valve is not working or tuned is also issued in act 1604, and the temperature correction factor used in the processor of FIG. 15 is changed to 0.0 in act 1605.

If the supply air temperature is within the range in act 1602, then the periodic error is calculated as the discharge air temperature-discharge air set point in act 1606. In act 1607, the cumulative error is calculated as the error from act 1606 plus the previous cumulative error. This calculation is performed periodically, such as every 60 seconds in synchronization with the reading of the discharge air temperature in act 1601. In act 1607, the process continues back to the start of the measurement process in act 1601.

Every hour or other period, an average error is calculated in act 1608 (e.g., cumulative error/60). If the average error is within a range, such as +/−2 degrees, the valve and control loop are operating properly as determined in act 1609. The cumulative error is reset to 0.0 in act 1610 and the process continues back to the start of the measurement process in act 1611. If the average error is outside the range, then the valve or loop tuning are not operating properly as determined in act 1612. Acts 1604, 1605, 1611, and 1612 are then performed. This action deals with control valves that fail, which helps to keep annual energy costs lower.

Figure 17:
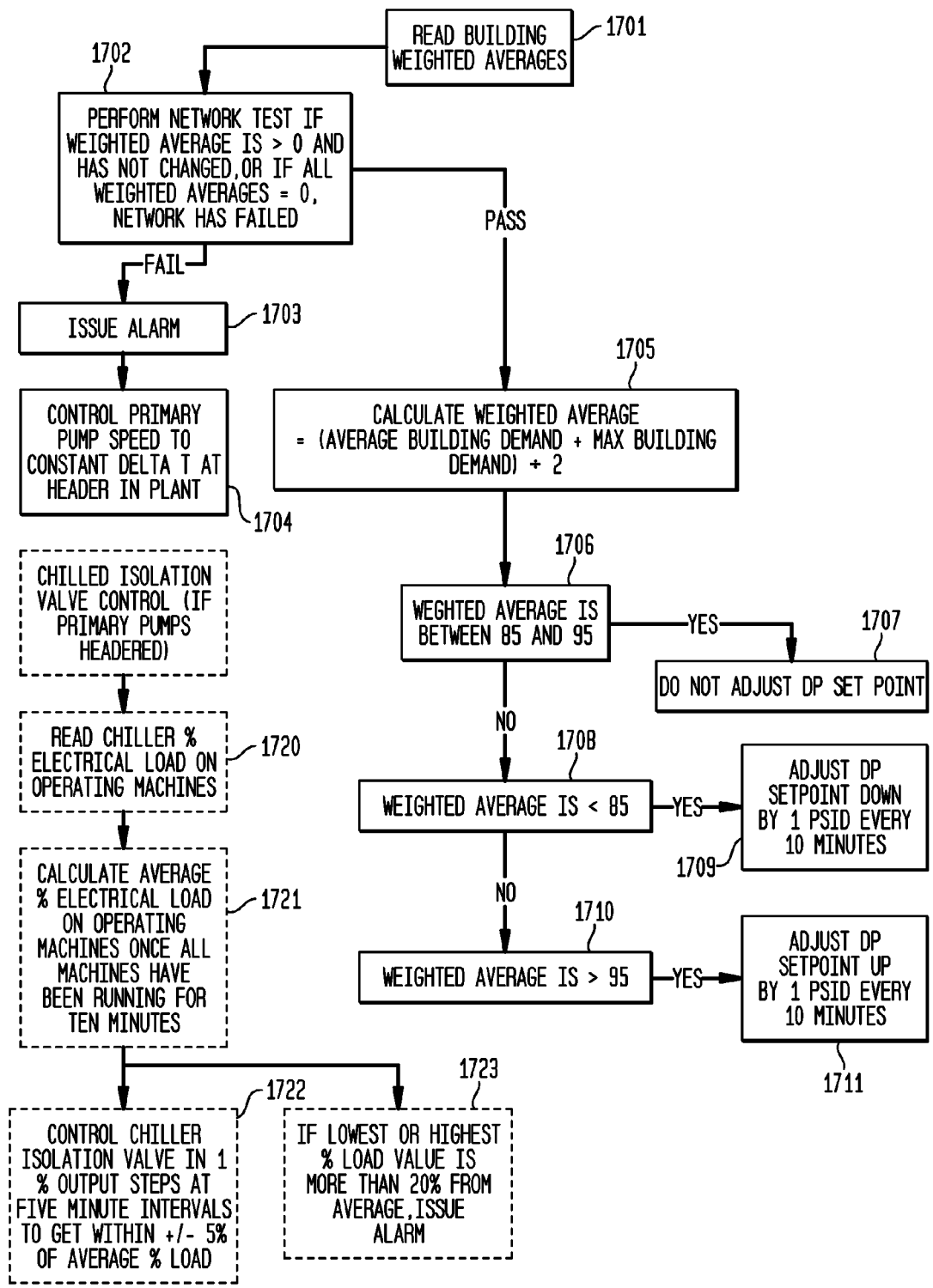
FIG. 17 is a flow diagram illustrating an exemplary routine or algorithm for chilled water flow pump control.

FIG. 17 shows one embodiment of controlling the flow of chilled water. The primary pump of the chilled water is controlled by a controller, such as a pump controller and/or other controller. These controllers are represented in general by the controller 302 or 1000 herein, but may be separate devices in communication with each other.

In act 1701, the building weighted averages from the air handling units (see act 1513 of FIG. 15) are read. If the weighted average is above 0 and has not changed over a time period or since the last performance of the act, or if all the weighted averages are 0, then the building automation network has failed. Act 1702 shows performing this test. If failure occurs, an alarm is issued in act 1703 and the primary pump speed is set to provide a constant delta T at the header in the water plant in act 1704. If the test of act 1702 passes, a weighted average is calculated in act 1705 as (the average building demand+maximum building demand)/2. In act 1706, the weighted average is checked to determine if the average is within a range, such as 85-95. If within the range, the pressure differential set point (DP) between chilled water supply and return line pressures is not changed in act 1707. If outside the range by being below in act 1708, the DP set point is adjusted down, such as by 1 PSID, in act 1709. If outside the range by being above in act 1710, the DP set point is adjusted up, such as by 1 PSID, in act 1711. The adjustment of acts 1709 and 1711 occur periodically, such as every 10 minutes.

FIG. 17 also shows control of the chilled isolation valve (see 210 in FIG. 2), such as when the primary pump is headered. In act 1720, the chiller % (i.e., percentage of) electrical load on the actual power load divided by the maximum power load operating chillers is read. In act 1721, the average % (i.e., percentage of) electrical load of the operating machines is calculated once the machines have been running for a period, such as 10 minutes. The chiller isolation valve is controlled in act 1722 in 1% output steps at intervals, such as 5 minute intervals, to get within a range (e.g., +/−5%) of the average % (i.e., percentage of) electrical load. If the lowest or higher % (i.e., percentage of) electrical load value is more than 20% from the average, an alarm is issued in act 1723.

Figure 18:
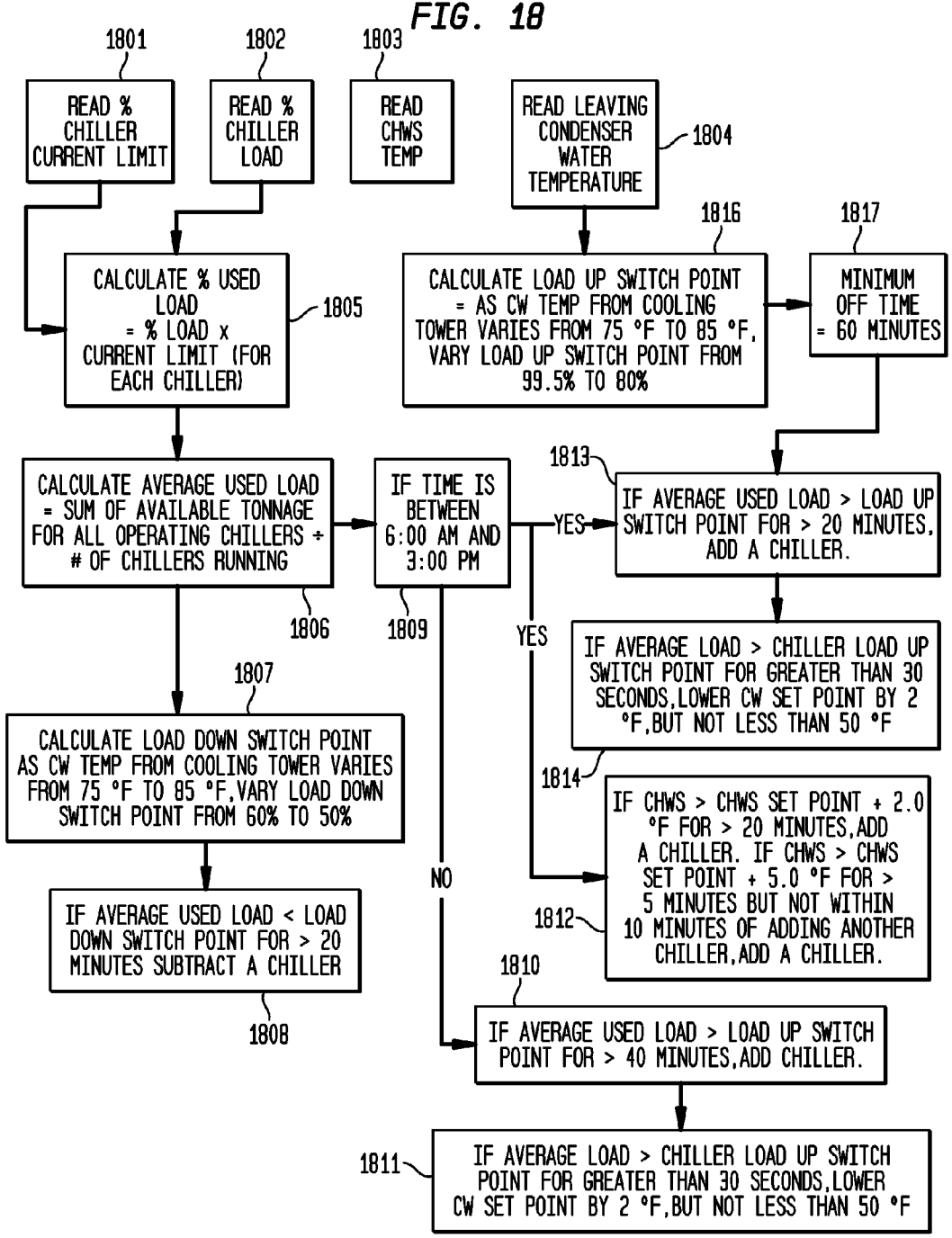
FIG. 18 is a flow diagram illustrating an exemplary routine or algorithm for chiller load calculation.

FIG. 18 shows one embodiment of a method or process for control of the chiller load. The control is performed by the controller 302 or 1000. For a chilled water plant with multiple air cooled chillers, the number of chillers operating at a given time varies based on the collective load on the chilled water plant.

In act 1801, the current percentage (%) level of operation relative to the chiller current limit (the maximum allowable operating limit on the chiller 112) is read from the chiller 112. In act 1802, the percentage of chiller load (i.e., "% chiller load" or "% load" in FIG. 18) is calculated by dividing the actual power by the maximum allowable power used by the chiller 112. In act 1803, the chilled water supply temperature is read. In act 1804, the leaving condenser refrigerant temperature is read. In act 1816, the load up switch point for the chiller 112 is calculated. As the chilled water temperature from the cooling tower varies from 75 degrees to 85 degrees, the load up switch point is varied from 99.5% to 80%. In act 1817, a check is performed that a minimum off time has occurred.

In act 1805, the % (i.e., percentage) of the used load is calculated as the % load×current limit of the respective chiller. The calculation is performed for each chiller 112. In act 1806, the average used load is calculated as the sum of available tonnage for all operating chillers 112 divided by the number of operating chillers 112. In act 1807, the load down switch point is calculated. The condenser refrigerant temperature set point is varied from one temperature (e.g., 75) to another (e.g., 85), and the load down switch point is varied from 60% to 50%. In act 1808, the average used load is compared to the load down switch point. If the average used load is less than the load down switch point for a period (e.g., 20 minutes), a chiller is removed or no longer operated. This action ensures that chillers are added or removed based on their most efficient point, which varies with ambient conditions. This action also improves oil movement inside the chiller, which reduces chiller failure rates.

In act 1809, a time check is performed. If not during the day time (e.g., 6 am to 3 pm), the average used load is compared to the load up switch point of act 1816 in act 1810. If the average used load is greater than the load up switch point for a period (e.g., 40 minutes), a chiller is added or started operating. In act 1811, the chilled water set point is lowered by an amount (e.g., 2 degrees) unless at a bottom limit (e.g., 50 degrees) if the average load is greater than the chiller load up switch point.

If during the day, the chilled water supply temperature is greater than the set point plus 2 degrees for a period (e.g., 20 minutes), a chiller is added in act 1812. If chilled water supply temperature is greater than the set point plus 5 degrees for a different period (e.g., 5 minutes), a chiller is added. This +5 degree check is not performed within 10 minutes of having added a chiller.

In act 1813, a chiller is added if the average used load is greater than the load up switch point for a period (e.g., 20 minutes). In act 1814, the chilled water set point is lowered by an amount (e.g., 2 degrees) unless at a bottom limit (e.g., 50 degrees) if the average load is greater than the chiller load up switch point.

Figure 19:
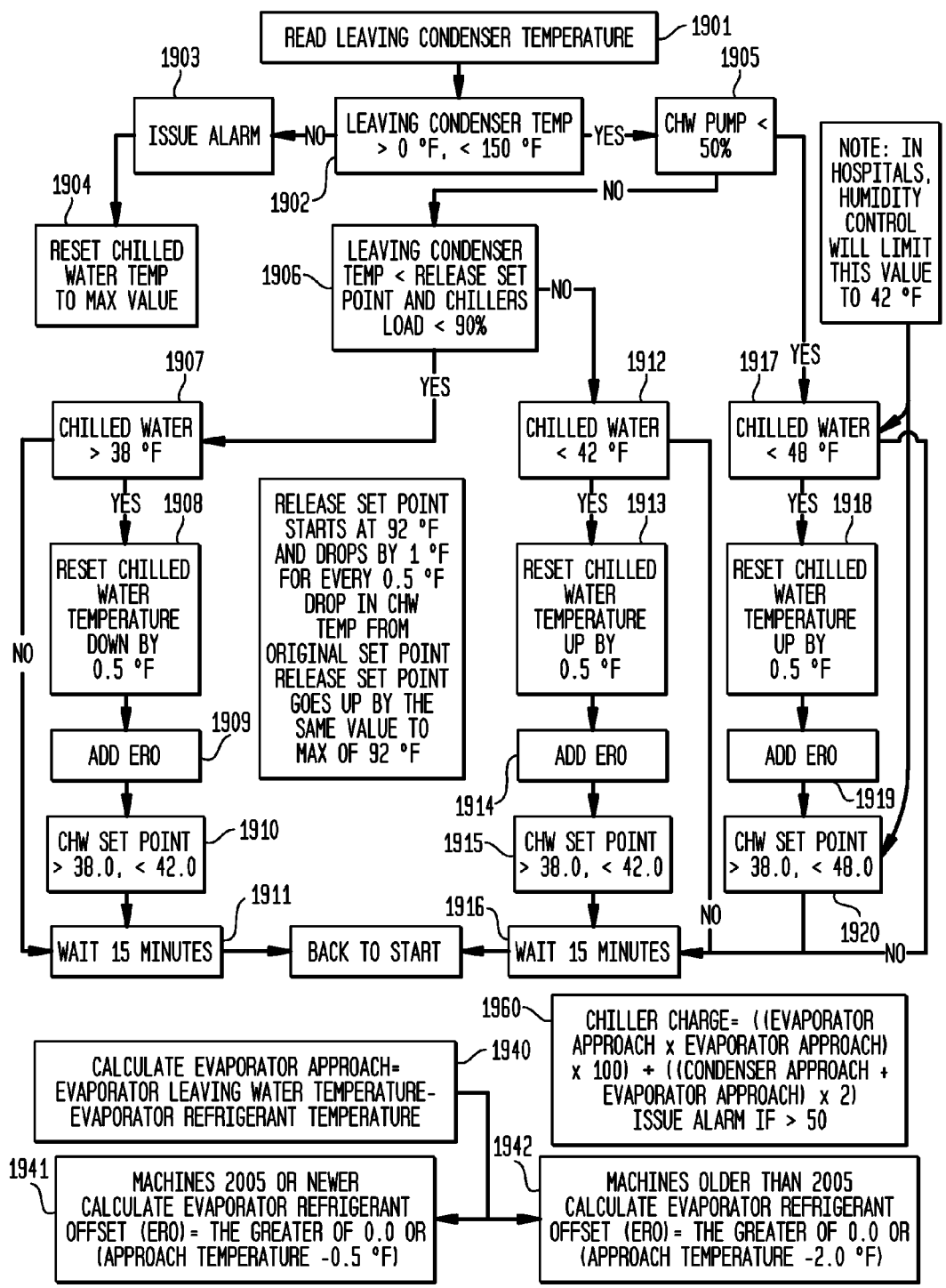
FIG. 19 is a flow diagram illustrating an exemplary routine or algorithm for resetting the chilled water temperature setpoint.

FIG. 19 shows one embodiment a method or process for resetting the chilled water temperature. The control is performed by the controller 302 or 1000. In act 1901, the temperature of the refrigerant leaving the condenser is read. If the temperature is outside a range (e.g., 0-150 degrees) as determined in act 1902, an alarm is issued in act 1903 and the chilled water temperature is reset to a maximum value in act 1904.

If within the range, the chilled water pump operation is checked in act 1905. In act 1906, if the pump is operating at more than 50%, the leaving condenser temperature is compared to a release set point and the chiller load is compared to a threshold (e.g., 90%). If the temperature is less than the set point and the load is less than the threshold, then the chilled water temperature is compared to a threshold in act 1907. If greater than the threshold, then the chilled water temperature is reset down by an amount (e.g., 0.5 degrees) in act 1908, the ERO is added in act 1909, and the chilled water set point is limited within a range in act 1910. After waiting a period (e.g., 15 minutes) in act 1911, the process continues back to start in act 1912 in act 1901. If the chilled water is less than the threshold in act 1907, the process proceeds to act 1911. This action helps to deal with efficient chiller operation when a chiller does not have its correct amount of refrigerant.

If the criteria for act 1906 are not met, then the chilled water is compared to a threshold (e.g., 42 degrees) in act 1912. If less than the threshold, then the chilled water temperature is reset up by an amount (e.g., 0.5 degrees) in act 1913, the evaporator refrigerant offset (ERO) is added in act 1914, and the chilled water set point is limited within a range in act 1915. After waiting a period (e.g., 15 minutes) in act 1916, the process continues back to start in act 1901. If the chilled water is less than the threshold in act 1912, the process proceeds to act 1916.

If the check of act 1906 shows the chilled water pump operating less than the threshold capacity (e.g., 50%), the chilled water is compared to a threshold (e.g., 48 degrees) in act 1917. This threshold may be different (e.g., 42 degrees) for environments with humidity control (e.g., hospital). If less than the threshold, then the chilled water temperature is reset up by an amount (e.g., 0.5 degrees) in act 1918, the ERO is added in act 1919, and the chilled water set point is limited within a range in act 1920. After waiting a period (e.g., 15 minutes) in act 1921, the process continues back to start at 1901 in act 1912. If the chilled water is less than the threshold in act 1917, the process proceeds to act 1920.

FIG. 19 also shows calculation of the ERO. In act 1940, the evaporator approach is calculated as the evaporator leaving water temperature–the evaporator refrigerant temperature. For new chillers, the ERO is set to the greater of 0.0 or (approach temperature–0.5 degrees) in act 1941. For older machines, the ERO is set to the greater of 0.0 or (approach temperature–2.0 degrees).

Another check is shown in act 1960. An alarm is sent if the chiller charge is above 50. The chiller charge is calculated as (evaporator approach$^2$×100)/((condenser approach+ evaporator approach)×2).

Other processes, different processes, or fewer processes may be provided. Additional, different, or fewer checks may be provided. Other thresholds, amounts, temperatures, times, periods, increments, changes, or adjustments may be used.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. An air cooled chiller comprising:
   a refrigerant loop having a compressor fluidly connected to a condenser, the condenser fluidly connected to an evaporator, and the evaporator fluidly connected to the compressor;
   a refrigerant pump and isolation valve in the refrigerant loop and fluidly connected in parallel between the condenser and the evaporator; and
   a receiver between the pump and the evaporator and fluidly connected with an output of the refrigerant pump.

2. The air cooled chiller of claim 1 further comprising a pressure sensor in the condenser, the refrigerant pump activated in response to a pressure from the pressure sensor being above a threshold and deactivated in response to the pressure from the pressure sensor being below the threshold.

3. The air cooled chiller of claim 2 wherein the isolation valve is configured to open when the refrigerant pump is not running and configured to close when the refrigerant pump is running.

4. The air cooled chiller of claim 1 further comprising a condenser fan positioned to cause air flow across the condenser.

5. The air cooled chiller of claim 4 wherein the condenser fan comprises a variable drive responsive to a measure of power used by the air cooled chiller.

6. The air cooled chiller of claim 1 wherein the receiver is fluidly connected between (i) the refrigerant pump and isolation valve and (ii) the evaporator.

7. The air cooled chiller of claim 1 wherein the evaporator comprises parallel evaporator parts and corresponding expansion valves, the expansion valves configured to fluidly connect and disconnect the evaporator parts individually based on chilled water temperature.

8. The air cooled chiller of claim 1 further comprising a controller configured to control flow of chilled water in the evaporator as a function of two or more of a position of a valve in an air handling unit, a temperature of the chilled water at the air handling unit, a size of the valve in the air handling unit, and a priority of the air handling unit.

9. The air cooled chiller of claim 1 further comprising a controller configured to control refrigerant temperature as a function of a position of a valve in an air handling unit.

* * * * *